US008306731B2

(12) United States Patent
Waggaman, III

(10) Patent No.: US 8,306,731 B2
(45) Date of Patent: Nov. 6, 2012

(54) SYSTEM AND METHOD FOR REPORTING PRODUCTIVITY

(75) Inventor: Thomas E. Waggaman, III, Vero Beach, FL (US)

(73) Assignee: Marine Imaging Systems S.A., Caleta Amarilla, Concon (CL)

( * ) Notice: Subject to any disclaimer, the term of this patent is extended or adjusted under 35 U.S.C. 154(b) by 377 days.

(21) Appl. No.: 12/444,154

(22) PCT Filed: Oct. 4, 2007

(86) PCT No.: PCT/US2007/080495
§ 371 (c)(1),
(2), (4) Date: Apr. 2, 2009

(87) PCT Pub. No.: WO2008/043049
PCT Pub. Date: Apr. 10, 2008

(65) Prior Publication Data
US 2010/0094687 A1 Apr. 15, 2010

Related U.S. Application Data

(60) Provisional application No. 60/849,252, filed on Oct. 4, 2006.

(51) Int. Cl.
G01C 21/00 (2006.01)
(52) U.S. Cl. .................................. 701/408; 340/438
(58) Field of Classification Search .................. 701/207, 701/24, 30, 35, 43, 213, 430, 408, 29.1, 32.1, 701/32.3, 32.4, 32.7; 340/438, 439, 576; 705/7.13–7.15, 7.21, 7.27, 7.38
See application file for complete search history.

(56) References Cited

U.S. PATENT DOCUMENTS

| 5,499,182 | A | 3/1996 | Ousborne | |
|---|---|---|---|---|
| 6,253,129 | B1* | 6/2001 | Jenkins et al. | 701/29 |
| 6,421,586 | B1 | 7/2002 | Nicotera | |
| 7,039,507 | B2* | 5/2006 | Hagenbuch | 701/29 |
| 7,246,009 | B2* | 7/2007 | Hamblen et al. | 701/209 |
| 7,616,105 | B2* | 11/2009 | Macielinski et al. | 340/439 |
| 2001/0018628 | A1 | 8/2001 | Jenkins et al. | |
| 2005/0171692 | A1 | 8/2005 | Hamblen et al. | |

OTHER PUBLICATIONS

International Search Report and Written Opinion, PCT/US2007/80495, dated Jul. 30, 2008 in 9 pgs.

* cited by examiner

Primary Examiner — Dalena Tran
(74) Attorney, Agent, or Firm — Knobbe, Martens, Olson & Bear, LLP

(57) ABSTRACT

Embodiments of the present disclosure provide systems and methods for assessing the productivity of workers employing vehicles at worksites. Devices are provided for characterizing vehicle usage into a variety of vehicle status categories. The time spent by the vehicle in the various status categories may be compared against relevant standards in order to provide useful measures of the vehicle's productivity. This productivity information may be further provided to a interface device on a continuous or periodic basis so as to allow the operator, construction managers and clients to easily access the information. These measures of productivity may be further combined with geographical information systems (GIS) in order to provide reports of productivity having a geographical context which yield further insights. From this information, appropriate incentives and sanctions may be provided to vehicle operators in order to reward or change behaviors, helping to maintain and enhance productivity.

10 Claims, 13 Drawing Sheets

SYSTEM AND METHOD FOR REPORTING PRODUCTIVITY

CROSS-REFERENCE TO RELATED APPLICATIONS

This Application is the US National Phase under 35 U.S.C. §371 of International Application No. PCT/US2007/080495, filed Oct. 4, 2007, which was published in English as International Publication No. WO 2008/043049 on Apr. 10, 2008, and claims the benefit of priority under of U.S. Provisional Application No. 60/849,252 filed on Oct. 4, 2006, entitled SYSTEM AND METHOD FOR REPORTING PRODUCTIVITY, the entirety of which is incorporated herein by reference.

BACKGROUND OF THE INVENTION

1. Field of the Invention

Embodiments of the invention relate generally to worksite monitoring and, specifically, to the use of motion sensors in conjunction with analysis devices for measurement of worker productivity.

2. Description of the Related Art

Construction is a $500 billon dollar global industry involved in the fabrication and maintenance of infrastructure around the globe. Examples of such infrastructure projects may include buildings, roadways, industrial plants, mining, forestry and public utilities. Typically, operators at a worksite employ construction vehicles to perform construction tasks. These operators are directly overseen by an on-site construction manager, who in turn reports to other managers involved in the project, such as project managers, design engineers, and/or project architects who may be located remotely or on-site.

Maintaining high worker productivity is an important part of keeping costs and time to completion of projects within budget. The cost of labor, fuel and maintenance of construction vehicles comprise a significant fraction of the budget of a construction project. If vehicles or construction personnel fail to perform work efficiently, budget targets may quickly be exceeded. Thus, in order to stay within allotted budgets, supervisors typically monitor the work and progress of employees. Furthermore, reports are often prepared to communicate status and progress to managers who are remote from the worksite.

Oversight can prove difficult to implement, however. In one example, a worksite may possess a high ratio of workers to supervisors and/or be spread out over a wide geographic area. These circumstances dilute the ability of supervisors to monitor employees effectively and the associated costs limit the feasibility increasing the supervisor to machine operator ratio. In another example, reports may be generated at periodic times to report progress, identify problems, and propose solutions. However, owing to the time and effort necessary to generate the reports, little information may be available in the interim. Thus, a manager or supervisor may be unaware if changes are necessary during this time. Furthermore, in light of lax oversight, workers may be tempted to "moonlight," performing unauthorized work projects for payment. This work diverts resources away from the contracted project, contributing to inefficiencies which may adversely impact budgets.

Therefore, there is a continuing need for systems and methods for measuring the productivity of workers, particularly in the construction industry.

SUMMARY OF THE INVENTION

In an embodiment, a method of measuring the productivity of an operating vehicle is provided. The method comprises electronically receiving a plurality of positions of the vehicle as a function of time, determining, with a computer processor, a provisional vehicle status based at least in part upon the received positions as a function of time, assigning the provisional vehicle status as a current vehicle status when the provisional vehicle status is continuously determined over a first selected time interval, recording the duration of the current vehicle status, and using at least duration of the current vehicle status over a second selected time interval to measure worker productivity.

In another embodiment, a system for monitoring the status of a vehicle is provided. The system comprises at least one sensor which is configured so as to electronically measure a plurality of positions of the vehicle as a function of time, a database containing at least one association between a vehicle status and a velocity range of the vehicle. Upon receipt of a velocity derived from the position as a function of time which lies within the velocity range, the database outputs the associated vehicle status as a function of time. The system further comprises a memory device which stores the position as a function of time and the associated vehicle status as a function of time and an interface device configured to provide a report containing at least one of the measured position as a function of time and the associated vehicle status as a function of time in response to a user request.

In a further embodiment, a method of representing the efficiency of a vehicle is provided. The method comprises electronically receiving a plurality of vehicle positions as a function of time, determining at least one vehicle status as a function of time, where the status is based at least in part upon the vehicle position as a function of time, determining at least one geographical area associated with a selected vehicle status over a selected time interval, calculating an efficiency of the vehicle using at least the total time the vehicle is determined to be in the selected vehicle status over the selected time interval, and providing a map upon which is superimposed a geometric figure representative of the geographic area, where the geometric figure is further provided with a visual indicator of the efficiency of the vehicle.

In an additional embodiment, a system for geographically representing the efficiency of a vehicle is provided. The system comprises a sensor configured to electronically measure a plurality of positions of the vehicle as a function of time, an analysis component which is configured to determine a work area over which the vehicle has worked within a selected time and an efficiency of the work based upon the vehicle's position as a function of time, and an interface device configured to provide reports containing at least a map upon which is superimposed a geometric figure representative of the geographic area, where the geometric figure is further provided with a visual indicator of the efficiency of the vehicle.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

DETAILED DESCRIPTION OF THE PREFERRED EMBODIMENT

The features of the systems and methods will now be described with reference to the drawings summarized above. Throughout the drawings, reference numbers may be re-used to indicate correspondence between referenced elements. The drawings, associated descriptions, and specific implementation are provided to illustrate embodiments of the invention and not to limit the scope of the disclosure.

In addition, methods and functions described herein are not limited to any particular sequence, and the blocks or states relating thereto can be performed in other sequences that are appropriate. For example, described blocks or states may be performed in an order other than that specifically disclosed, or multiple blocks or states may be combined in a single block or state.

Embodiments of the present disclosure provide systems and methods for assessing worker productivity at construction worksites. Devices are provided for characterizing vehicle usage into a variety of vehicle status categories. The time spent by the vehicle in the various status categories may be compared against relevant standards in order to provide useful measures of the vehicle's productivity. This productivity information may be provided to an interface device on a continuous or periodic basis so as to allow construction managers and clients to easily access the information. From this information, appropriate incentives and sanctions may be provided to vehicle operators in order to reward or change behaviors, helping to maintain and enhance productivity.

These measures of productivity may be further combined with geographical information systems (GIS) in order to provide reports of productivity having a geographical context. With measures of productivity presented in a geographical context, managers and supervisors may determine not only what work is being performed but how much work is performed and where the work is being performed. Thus, failure to work (idling or stopped equipment), unauthorized work (moonlighting) and unbudgeted (unknown to management) work necessary for project completion may be identified. With this identification, work flow processes to accelerate job completion, inhibit moonlighting, and budgeting for previously unknown work may be may be implemented. These and other objects and advantages of the present disclosure are described in detail below.

Figure 1:
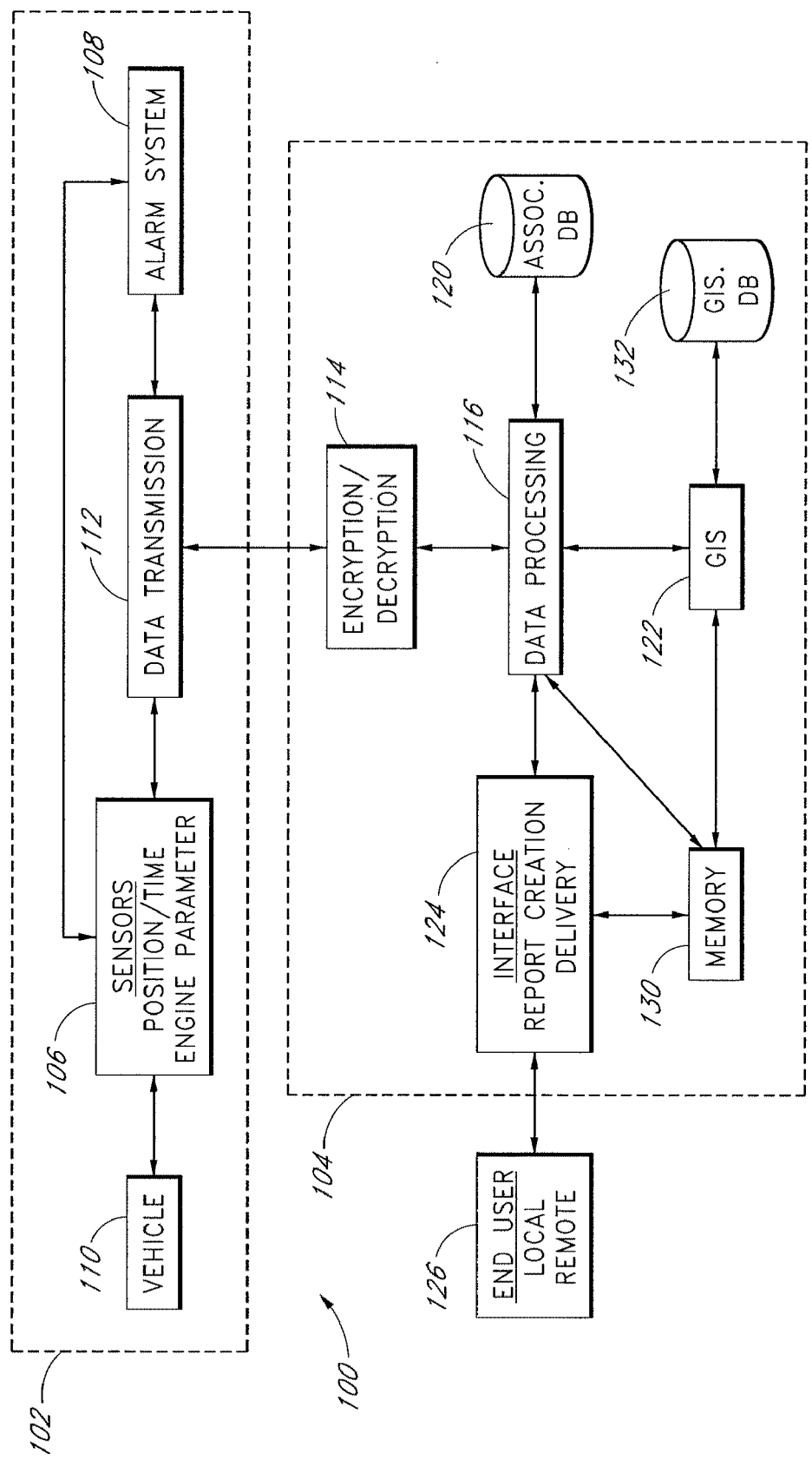
FIG. 1 illustrates an embodiment of a productivity assessment system of the present disclosure.

FIG. 1 illustrates an embodiment of a productivity assessment system 100 of the present disclosure. The system 100 comprises a vehicle data collection system 102 and a vehicle data delivery system 104. The data collection system 102 is configured to measure at least one of position, velocity, and/or engine information pertaining to a plurality of vehicles 110 as a function of time and to communicate this information to the data delivery system 104. The data delivery system 104 is configured to receive the information from the data collection system 102 and disseminate it to users 126 of the system 100.

In further embodiments, prior to delivery by the data delivery system 104, the information gathered by the system 100 is analyzed to measure of the productivity of the vehicles 110. In one embodiment, the analysis comprises calculation of vehicle velocity based upon the measured positions as a function of time (if velocity is not directly measured), determination of at least one vehicle status based the velocity alone or the velocity in combination with the engine parameters, and comparison of the time recorded for a plurality of selected vehicle statuses with relevant standards. In further embodiments, the analysis may further employ GIS data as well as the vehicle position and status as a function of time to further characterize the vehicle productivity.

In an embodiment, the analysis of the vehicle information may be performed by the data collection system 102. In another embodiment, the analysis may be performed by the data delivery system 104. In further embodiments, selected data analysis may be performed by each of the data collection and data delivery systems 102, 104. The raw and analyzed data may be further organized into reports for dissemination to users 126 by the data delivery system 104.

As illustrated in the embodiment of FIG. 1, the data collection system 102 comprises at least one sensor 106 in communication with at least one vehicle 110, a data transmission device 112, and an alarm system 108. In an embodiment, the sensor 106 is configured so as to measure at least the position of the vehicle 110 as a function of time. In an alternative embodiment, the sensor 106 is configured to measure at least the velocity of the vehicle 110 as a function of time. In another embodiment, the sensor 106 is configured so as to measure at least one parameter indicative of the vehicle's engine performance. In an alternative embodiment, the sensor 106 may be configured to measure combinations of the vehicle's position, velocity, and engine parameter, as a function of time. In further embodiments, the measured positions and/or times may be for a portion of the vehicle 110, such as the bucket of a backhoe, or movement of the entire vehicle 110.

In certain embodiments, the vehicle 110 comprises a construction vehicle. Examples of construction vehicles may include, but are not limited to, backhoes, bulldozers, trucks, earthmovers, motorgraders, and sheepsfoots. In alternative embodiments, the vehicle 110 may comprise a freight vehicle such a semi-trailer truck or a train.

Embodiments of the alarm system 108, described in greater detail below, are configured to communicate with the sensor 106 and the data transmission device 112 to determine if the data collection system 102 is tampered with. Such tampering may comprise unauthorized access of the data collection system 102 and/or disabling one or more components of the data collection system 102 in an effort to sabotage the data collection process. In the event that tampering is detected or suspected, the alarm system 108 issues alert reports to the data transmission system 112 which are transmitted to the data delivery system 104, allowing managers and supervisors to be informed of the possible tampering and to dispatch repair personnel.

In an embodiment, the sensor 106 may comprise at least a portion of a positioning system capable of measuring a plurality of positions of the vehicle as a function of time. Such positioning systems may comprise global satellite navigation systems. Satellite navigation systems provide reference positions by the use of known satellite positions at a particular point in time, the emission of data flows by multiple satellites, and the comparison of signal reception time on the positioning device. Examples include the NAVISTAR Global Positioning System (GPS) developed by the United States Department of Defense, commonly referred to as "GPS", the Global Navigation Satellite System (GLONASS) operated by the Russian Space Forces, and the GALILEO positioning system, a planned global navigation satellite system under development by the European Union.

In other embodiments, the sensor 106 may determine the vehicle position as a function of time using a land-based triangulation type system. Such triangulation systems employ multiple emitters located at known positions and use the calculation of reception time of two or more radio frequency (RF) or light (such as laser) emission stations located at known positions. The time of capture of particular signal capture at the sensor 106 is recorded and compared for use in determining the position and/or velocity of the sensor 106.

In further embodiments, the sensor 106 may comprise a portion of a direction finding system, located on the vehicle 110 or elsewhere. Such direction finding systems are capable of capturing, through the use of RF or light signals, the range and bearing of the sensor 106 to or from one or more emitter stations located at one or more known geographical positions and calculating positions of the vehicle as a function of time.

In additional embodiments, the sensor 106 may employ an inertial guidance system. Internal guidance systems employ a known starting point and, through the measurement of subsequent movement and time, calculate the vehicle's position in time. These systems may be used to make a direct measurement of velocity or the use the velocity to calculate positions in time. These systems may use gyrocompasses.

In a further embodiment, the sensor 106 may utilize measurement of wheel revolutions (data logging) for the direct recording of velocity, and the recording from an additional sensor of direction of travel.

In additional embodiments, the sensor 106 may be configured so as to measure at least one parameter indicative of the status of the engine. Examples of such parameters may include, but are not limited to, alternator output, manifold air temperature, engine temperature, manifold absolute pressure, airflow, throttle position, engine speed, oxygen consumption, exhaust gas composition, the activation of electrical pumps for hydraulics and vibration. Further examples may include fuel level, fuel, vacuum pressure, hydraulic pressure, pneumatic pressure, and oil quality. Such parameters may be utilized in conjunction with the vehicle position measurements to establish the vehicle status, as discussed in greater detail below.

The sensor 106 communicates the position and/or engine parameter data (referred to herein as vehicle data) to the data transmission device 112, which is configured to communicate with the data delivery system 104. The data transmission device 112 may further comprise memory and data processing capabilities. In an embodiment, the data transmission device 112 comprises a wireless transmission device. Such wireless devices may include radio frequency (RF) transmission systems capable of establishing communications with intermediate data relay antennas, including the various bandwidths, and protocols used in the radio and light spectrum. These systems further include satellite based, commercial and "free public spectrum" devices. Antennas for the relay of signals may be located on the ground, airborne, or in space.

In one embodiment, the vehicle data may be continuously provided to a computer processor of the data transmission device 112. For example, the data may be continuously updated in an 8 MHz processor with 4 Kb of RAM, which is a component of an ORBCOMM satellite communicator (Orbcomm, Inc. Fort Lee, N.J.), or may be added to an integrated circuit board system which works with an ORBCOMM system.

In alternative embodiments, the data transmission device 112 may comprise a datalogging system. The datalogging system saves the vehicle data to electronic memory. The vehicle data is subsequently transmitted to the data delivery system 104 at a later date in time which is logistically convenient. For example, the transmission device 112 may transmit the stored vehicle data when the vehicle 110 enters an evening parking area and comes within the coverage area of local data transmission RF or light spectrum networks. In another example, the data transmission device 112 may transmit the stored vehicle data when connected to a cable.

In certain embodiments, the position data may be compressed for transmission to the data delivery device 104. Embodiments of the compressed position data are described in Chilean Registration No. 114,671, titled "MARIMSYS VMS VERSION 3.1", registered on Jun. 8, 2000, the entirety of which is hereby incorporated by reference.

In an embodiment, 256 squares of latitude and longitude, each measuring one square degree, are assigned to an area of frequent movement of the vehicle. The upper left corner of these squares defines a particular 'x' Longitude and 'y' Latitude pair. S squares are arbitrarily assigned and named in a correspondence table for up to the 256 available 8 bit binary values. Each binary value so assigned corresponds to a point at the integer value of the Latitude-Longitude referenced by the binary. When positions which occur within these specifically named squares are to be transmitted, the binary value in 8 bits (in certain embodiments, 7 or even less possibilities may be provided) is substituted for the corresponding 'x' Longitude and 'y' Latitude pair and is the actual compressed data, which is transmitted. Decimal fractions of Latitude Longitude squares may be used in reduced areas to increase precision while maintaining economy of bandwidth usage. Areas which are not covered in this frequent movement area may be transmitted in the uncompressed, higher bandwidth consuming Latitude-Longitude format. Advantageously, this position reporting scheme allows the use of the highly compacted method of referring to a Latitude-Longitude pair, or fraction thereof, in areas where the vehicle performs the majority of its movement, while also covering the balance of possible movements outside this area with a less bandwidth efficient format.

In certain embodiments, decimal fractions of x Longitude and y Latitude which are generated by the difference in position between the vehicle and the integer value of the Latitude Longitude grid reference are converted and rounded using binary mathematics and transmitted as offsets to the Latitude Longitude integer pairs discussed above. This process creates a rounding error, which is directly proportional to the number of bits used to express the final resulting fraction of a degree. For example, 111,120 meters per degree of Latitude divided by the hexadecimal equivalent of 10, 11, 12, 13, and 15 bits produces an error respectively of 108.5, 54.3, 27.1, 13.6, 6.8, and 3.4 meters. At higher latitudes, a lower precision of longitude, e.g. less bits, may be used to create approximately the precision. Depending upon the sensitivity of the sensor 106 employed in the system 100, the precision of the underlying latitude and longitude position varies. It is inefficient to use more decimals than the precision of the underlying data actually represents. Thus, the data transmission or calculation operations are rounded down to approximate the precision of the data.

In one embodiment, the vehicle data is received by the data delivery system 104 for subsequent analysis and determination of the vehicle status as a function of time. The data delivery system 104 comprises an optional encryption/decryption device 114, a data processing device 116, an association database 120, a GIS 122, GIS database 132, memory 130, and an interface device 124.

In certain embodiments, the data transmission device 112 may be configured to transmit the vehicle data in an encrypted format. Such encryption may be employed to preserve the confidentiality of the transmitted vehicle data, should unauthorized parties gain access to the transmission. Alternatively, encryption may be employed to preserve the integrity of the data by eliminating the possibility that an alternative data stream is substituted in place of the original data. In further embodiments, the data transmission device 112 may be employed to compress and reduce the bandwidth required for transmission of vehicle data. The encryption/decryption device 114 receives transmissions from the data collection system 102, determines if the transmissions are encrypted, and, if so, performs the decryption processes necessary to allow the vehicle data to be further handled by the data delivery system 104.

In alternative embodiments, the vehicle data received from the data collection system 102 is not encrypted may be directly received by the data processing device 116. In such embodiments, the encryption/decryption device 114 may be bypassed or eliminated from the data delivery system 104.

As discussed in greater detail below, the data processing device 116 is further in communication with an association database 120 in order to determine vehicle status. In one embodiment, the association database 120 is a data structure containing a plurality of associations between a velocity range of the vehicle and a vehicle status. Upon calculating or receiving the vehicle velocity, the data processing device 116 inputs the velocity to the association database 120, which in turn outputs a corresponding vehicle status. In another embodiment, the association database 120 and/or data processing device 116 comprise programmed logic which allows the use of the engine parameter data to make additional vehicle status determinations. The vehicle statuses so determined may be directly provided to the interface device 124 from the data processing device 112 or stored in the memory 130, or GIS database 132, for later use by the interface device 124.

The engine parameter data and at least one of the position and velocity data may be further employed to verify the proper operation of the sensor 106. In one example, the engine data and combinations of the position and velocity data may be examined at the same time. In the event that vehicle motion is detected, such as a change in position over time or a direct measurement of non-zero velocity, without a corresponding engine parameter being detected, then it may be inferred then the engine is working but the sensor 106 is not properly outputting the engine parameter. Similarly, if a plurality of engine parameters consistent with movement, such as high vibration, are detected without corresponding movement, then it may also be inferred that the engine is working but the sensor 106 is not properly outputting the position and/or velocity data.

In an embodiment, the interface device 124 comprises a plurality of computing devices configured to allow users of the system 126 to submit queries to the system 100 over a network and to receive responses to those queries. For example, the network may comprise any combination of a WAN, LAN, intranet, or the Internet. In another example, the interface device may comprise a web server. The response provided to the system users 126 may comprise unanalyzed vehicle data, analyzed vehicle data such as vehicle status, a plurality of reports, as described in greater detail below, and combinations thereof. In alternative embodiments, where the system 100 is designed to provide feedback information to a vehicle operator, the interface device 124 may either provide, or directly link to components, which provide, all functions of the system 100.

Non-limiting examples of the velocity ranges, engine parameters, and associated vehicle status are illustrated below in Table 1.

TABLE 1

Vehicle status determined from velocity
and, optionally, engine parameter

| Example | Velocity | Engine Parameter | Vehicle Status |
|---|---|---|---|
| 1 | ~0 | First/Last signal of day | Start/Stop |
| 2 | ~0 | Signals received after start and before first movement | Warm-up |
| 3 | ~0 | Running | Idle |
| 4 | V > 0 | Not recorded | Malfunction |
| 5 | $V_1 > V(t) > V_2$ | N/A; Running | Working |
| 6 | $V_3 > V(t) > V_4$ | N/A; Running | Traveling |

In Example 1, the first and last engine parameters output by the engine are collected by the sensor 106 and used to indicate the engine start time and shutoff time. Such times are useful as baselines for calculating the moment when the vehicle operator appeared on the worksite in the morning and left in the evening.

In Example 2, the velocity of the vehicle 110 is measured to be approximately 0 immediately after startup and before warm-up, for example, less than about 1 MPH, and the engine parameter indicates that the engine is running. The vehicle 110 under these conditions is determined to be in a warm-up idle, a condition which ends upon movement of the vehicle. This vehicle status may be of particular interest as an indication of whether the operator follows the manufacturer's guidelines for warm-up of the machine. Failure to follow such guidelines may detrimentally affect overall engine life.

In Example 3, the velocity of the vehicle 110 is measured to be approximately 0 and engine parameter indicates that the engine is running at a time not immediately after startup. The vehicle 110 is determined to be in an idle status under these circumstances. Measurement of the total time the vehicle 110 spends idling may be beneficial, as excessive amounts of idle time alter the chemical balance of the oil. Thus, with this knowledge, the interval at which oil should be changed may be adjusted accordingly.

In Example 4, the velocity of the vehicle 110 is measured to be greater than zero but no engine parameter is recorded. In this situation, the vehicle sensor status may be logged as in a malfunctioning status. As discussed in greater detail below, the determination of malfunctioning status may result in generation of a report to indicate that a service visit to the vehicle 110 is necessary to check the sensor 106. This malfunction is not considered to be a critical malfunction, however, and the sensor 106 will continue to record vehicle status as a function of time and the time of first and last movement as a guide to the operator's workday.

In Examples 5 and 6, the engine parameter may be optionally omitted, or may be inoperative, when making the vehicle status determination. In Example 5, the vehicle velocity lies between a first and a second velocity, $V_1$ and $V_2$, which is consistent with performance of work. In this situation, the vehicle determined to be in a working status. In Example 6, the vehicle velocity is measured to be greater than $V_2$ and consistent with vehicle travel. In this situation, the vehicle 110 is determined to be in a traveling status.

Various errors in position measurement, such as GPS errors, may introduce small apparent changes in the position, and give the appearance of small velocities, when in fact the vehicle is stationary. These errors, which include statistically predictable small error ranges of approximately 1 MPH and also include higher value outlier events, can be filtered out to achieve the correct characterization of very slight movement which is, effectively, lack of movement. For example, filtration to eliminate these outlier errors may be achieved through the averaging of a series of positions or the averaging of a series of velocities derived from those positions.

In certain embodiments, the velocity ranges associated with the vehicle statuses such as working, traveling, and idling may be tailored to specific pieces of equipment. Examples of such velocity ranges are illustrated below in Table 2, in miles per hour.

TABLE 2

Velocity ranges for idle, working, and traveling in specific construction vehicles

| Vehicle | Idle | Working | Transit |
| --- | --- | --- | --- |
| Motograder | $V(t) < 1$ | $1 < V(t) < 9$ | $9 < V(t)$ |
| Tracked backhoes | $V(t) < 1$ | $1 < V(t) < 3$ | $3 < V(t)$ |
| Crawler excavators | $V(t) < 1$ | $1 < V(t) < 3$ | $3 < V(t)$ |
| Bulldozer | $V(t) < 1$ | $1 < V(t) < 3$ | $3 < V(t)$ |

In an example, the working velocity range of a backhoe may be the range of velocities which may be achieved during movement of the arm, without movement of the vehicle. In another example, motion of a vehicle such as a bulldozer or sheepsfoot, or any component of the vehicles, such as the backhoe's bucket, at velocities greater than zero but less than the lower bound of the transit velocity range, may be attributed to a working status. In certain embodiments, these velocities may change with the specific tasking of the machinery, thus, the vehicle data will have different utility in analyzing the operation of each type of machinery.

Instantaneous measures of vehicle status may be misleading in measuring productivity, however. For example, it is a normal part of working that a motograder will stop and reverse, stop at a stop sign, or wait for a vehicle to pass. Further, this lack of activity may last for durations on the order of tens of seconds. Categorizing this work as idling time, as a result of the stops, would fail to properly capture the nature of the work and lead to inaccuracies in the vehicle statuses measured by the system 100.

Figure 2A:
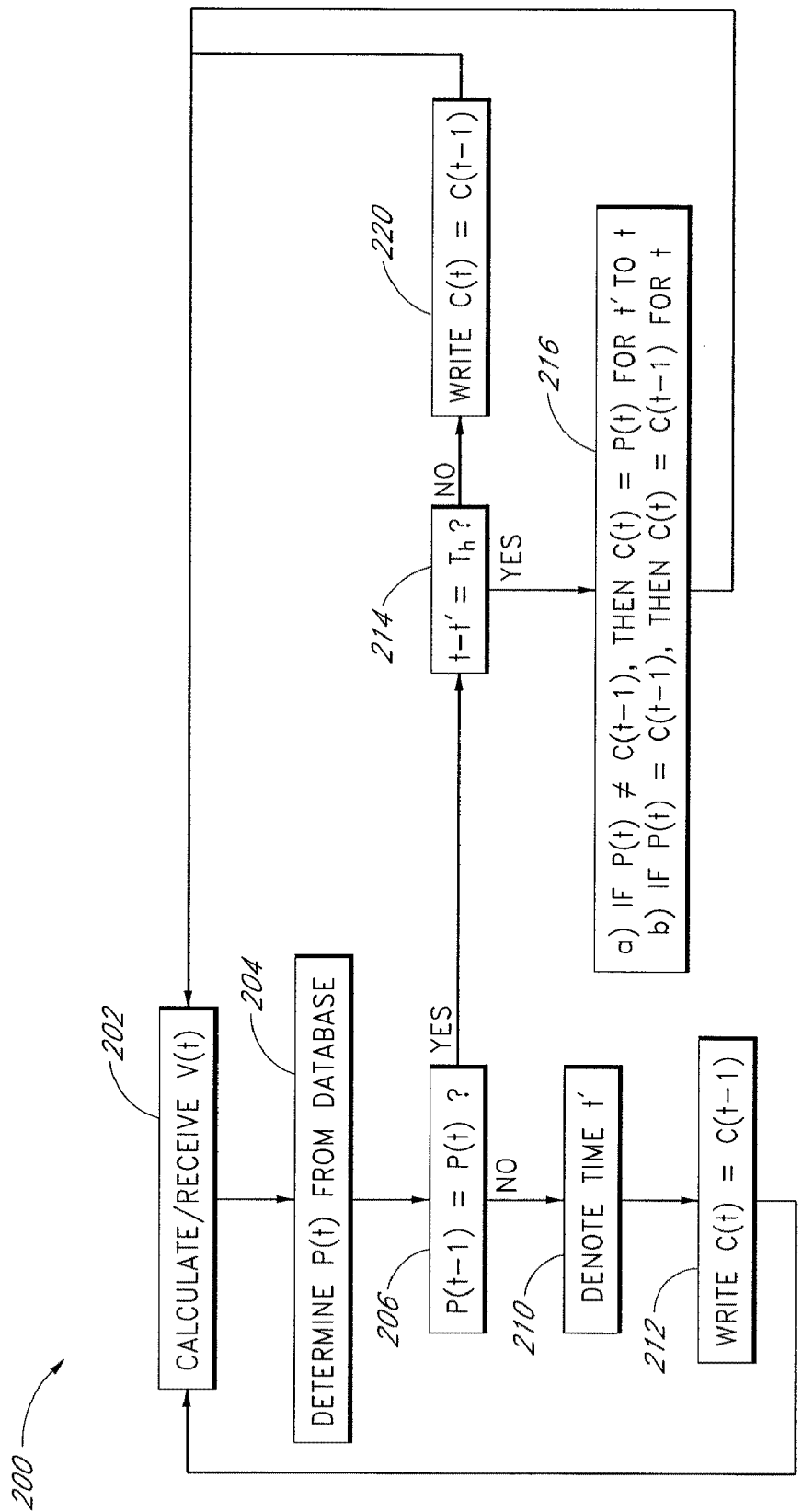
FIG. 2A is a flowchart illustrating an embodiment of a method of determining at least one vehicle status of a vehicle employing the productivity assessment system of FIG. 1

To address this issue, the data processing device 116 employs a method 200, illustrated in FIG. 2A. The method 200 employs two different vehicle statuses, a "provisional" or "instantaneous" status and a "current" status. The provisional status represents a preliminary determination of the vehicle status. The current status represents a final determination of the vehicle status which is, under most circumstances, reported to the memory 130 and/or interface device 124.

When a change in vehicle status is detected, time is immediately assigned to the new status in a provisional status buffer. The current status buffer, however, continues to assign time to the old vehicle status. Only when the provisional status continuously accumulates time in new status for a sufficient length of time does the method 200 begin to assign time in the current status buffer to the new status. Thus, the "sufficient time", referred to herein as the "hypsometric interval," or selected interval, indicates that the activity status of the vehicle should be changed.

This interval takes into account the patterns of heavy equipment activity in order to avoid overall mischaracterization. The interval is also kept substantially constant so as to provide a substantially constant view over weeks and months to observe if the operator is improving productivity. Thus, in the motograder example above, the hypsometric interval is designed to be of sufficiently long duration that lack of activity for tens of seconds in the normal course of working is not assigned to the current status as idling time and is instead correctly assigned as working time. In one embodiment, an interval of approximately 1 minute may be sufficient to justify a change in the current status.

Likewise as in the example above, when a motograder is in transit from one work area to another, it moves at a velocity greater than the range of velocities associated with work. Thus, the data processing device 116 should properly assign the vehicle time to a current status of "transit time". When the motograder stops at a stop sign, or waits for traffic to pass, however, a change in the current status from transit to idle should not be made, provided that the stop time does not exceed the "hypsometric interval."

In certain embodiments, the hypsometric interval can be varied to accommodate different activities of the construction vehicles. A motograder which is engaged in road profiling over long distances will tend to have a longer hypsometric interval than a motograder which idles at the side of a fill spreading team and conducts work activity for brief spurts as it performs the brief pass of fill spreading. Measuring more precisely the starts and stops of fill spreading creates useful information as to the performance and efficiency of the other machinery and workers in the fill spreading team. The objective of the hypsometric interval is to both correctly characterize activity through brief changes in velocity and to provide a reasonable statistical basis for comparison between different machines and groups of machines to enable realistic goals to be set.

Figure 2B:
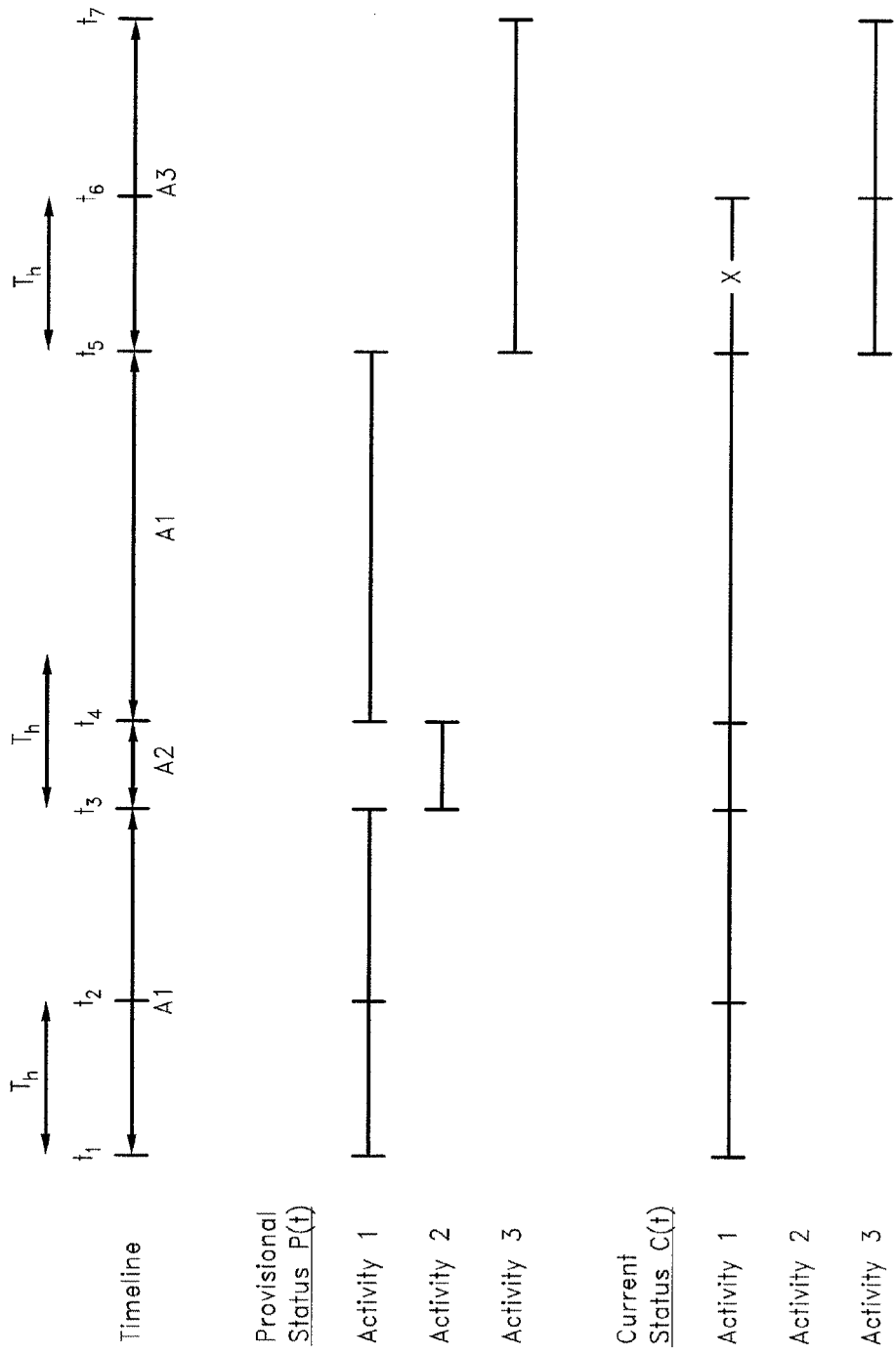
FIG. 2B is a timing diagram illustrating an example of use of the method of FIG. 2A to assign time to various vehicle statuses.

FIG. 2A illustrates one embodiment of the method 200 of performing the vehicle status analysis. For illustrative purposes, the method 200 is concurrently discussed in reference to an exemplary vehicle status timing diagram, shown in FIG. 2B. In FIG. 2B, an activity timeline is illustrated with three activities, A1, A2, and A3. A variety times, $t_1$-$t_7$, are further indicated on the timeline to mark a variety of events which occur. At time $t_1$, the method 200 begins assigning time to the provisional and current status buffers. From times $t_1$ to time $t_3$ and times $t_4$ to $t_5$, the vehicle status comprises activity A1. From time $t_3$ to $t_4$, the vehicle status comprises activity A2. From times $t_6$ to $t_7$, the vehicle status comprises activity A3. FIG. 2B further illustrates the time assigned to the provisional and current status buffers by the method 200 based upon this timeline.

The method 200 begins in Block 202, where the velocity of the vehicle 110 is calculated or received. In an embodiment, this velocity may be calculated by the data processing device 116 based upon a plurality of positions as a function of time data measured by the sensor 106. In another aspect, the data processing device 116 may read in velocity data which has been directly measured by the sensor 106.

In Block 204, the provisional vehicle activity, P(t), is determined. In an embodiment, the vehicle velocity is communicated by the data processing device 116 to the association database 120, which determines the velocity range containing V(t) and returns the corresponding vehicle status. The method 200 then proceeds to Block 206. For example, as illustrated in the timeline of FIG. 2B, vehicle activity at time $t_1$ is A1. Thus, the method 200 initially determines P(t) to be activity A1.

In Block 206, the method 200 uses the P(t) status buffer to compare the provisional status P(t) determined at time t to the provisional status measured at the last time increment, P(t−1). If P(t) is not equal to P(t−1), then the method 200 determines that a change in the provisional vehicle status has occurred over the time interval t−1 to t and proceeds to Block 210. If P(t) is equal to P(t−1), then the method 200 determines that no change the provisional vehicle status has occurred in the time interval from t−1 to t and proceeds to Block 214. In FIG. 2B, it is observed that, at time t=$t_1$, no time has yet been written to the provisional status buffer and, therefore, P(t−1) is a null value. As a result, the method 200 determines that P(t) and P(t−1) are not equal and proceeds to Block 210.

In Block 210, the time at which the discontinuity in the provisional status activity is detected, noted as t', and the method 200 moves to Block 212. In Block 212, the current status at time t, C(t), is assigned to be equal to the current status at the last time increment, C(t−1). This assignment reflects that changes in vehicle status are not represented in the current status until the new status continuously persists for a duration longer than the hypsometric interval. Because there is no record of C(t−1) at time $t_1$, however, no vehicle status is assigned time to the current status buffer.

The method 200 proceeds to increment in time and loops back to Block 202. In Blocks 202, 204, and 206 the instantaneous velocity, V(t) and the provisional status P(t) are determined and the comparison between the provisional status at P(t) and P(t−1) is made as discussed above. As illustrated in timeline of FIG. 2B, P(t) is constant for $t_1$<t<$t_2$. Thus, for the time interval $t_1$<t<$t_2$, the method 200 determines that P(t)=P(t−1) in Block 206 and moves to Block 214.

In Block 214, the method 200 determines whether the change in the provisional status has continuously persisted for a duration longer than the hypsometric interval, denoted $T_h$. If the method 200 determines that the change in provisional status has not persisted for a duration equal to $T_h$, the method 200 moves to Block 220. If the method 200 determines that the change in provisional status has persisted for a duration equal to $T_h$, the method 200 moves to Block 216. As illustrated in FIG. 2B, for $t_1$<t<$t_2$, the duration of the change is less than $T_h$. Thus, the method 200 moves to Block 220.

In Block 220, similar to Block 212, the method assigns C(t) to be equal to C(t−1). Because there is no record of C(t−1) at time $t_1$<t<$t_2$, however, no vehicle status is assigned time to the current status buffer. The method 200 then proceeds to increment time and loop back to Block 202.

For all times $t_1$<t<$t_2$ the provisional status remains unchanged and the change initially determined at t=$t_1$=t' does not persist longer than $T_h$. Thus, the method 200 loops between Blocks 202, 204, 206, 214, and 220 for this time interval, as discussed above.

At time t=$t_2$, the method 200 moves through Blocks 202, 204, and 206 and in Block 214, determines that the change in P(t) has persisted for at a duration equal to $T_h$. The method 200 then proceeds to Block 216 where the method 200 determines under what circumstances the duration $T_h$ has been exceeded and how the current status should be updated.

If P(t) and C(t−1) are not the same, case a), then the method 200 determines that the current status should be updated to reflect the provisional status. Furthermore, this update should be assigned for the entire time between when the change was first identified, t', and the present time t. This retroactive assignment is indicative of the fact that that the old vehicle status assigned to C(t) for t' to t was incorrect and the current status is updated over this time period accordingly.

If P(t) and C(t−1) are the same, case b), then the method 200 determines that the current status continues to be correctly assigned. Therefore, C(t) at time t is assigned equal to C(t−1).

Examining the timeline of FIG. 2B at time $t_2$, it can be seen that the conditions of case a) are satisfied. Because no vehicle status was written to the current status buffer over times from t' to t, P(t)=A1 C(t−1). Thus, in accordance with case a) of Block 216, C(t) between t'=$t_1$ and t=$t_2$ is assigned to A1. The method subsequently loops back to Block 202.

Examining the timeline of FIG. 2B for times between $t_2$ and $t_3$, the provisional status P(t) is observed to remain unchanged. Furthermore the change initially determined at time $t_1$=t' continues to persists for a duration longer than $T_h$. Thus, the method 200 follows Blocks 202, 204, 206, 214 and returns to Block 216. Over this time interval, $t_2$<t<$t_3$, the conditions of case b) are satisfied, in contrast to time t=$t_2$. Therefore, C(t) at time t is assigned to be equal to C(t−1), which is activity A1. The method 200 then loops back to Block 202.

At time $t_3$, the method 200 detects a change in the provisional status from activity A1 to activity A2. As described above, the method 200 follows Blocks 202, 204, 206, 210, and 212, noting t=$t_3$=t' and assigning C(t) to be equal to C(t−1), which is activity, A1.

For times $t_3$<t<$t_4$ the provisional status remains unchanged from activity A2. Furthermore the change in provisional status over the time range $t_3$<t<$t_4$, from activity A1 to A2, has not persisted longer than $T_h$. Thus, over this time interval, the method 200 loops between Blocks 202, 204, 206, 214, and 220, assigning the C(t) to be equal to C(t−1), activity A1.

At time $t_4$, the method 200 determines that the provisional status has changed back to A1 from A2. As described above, the method 200 follows Blocks 202, 204, 206, 210, and 212, noting t'=$t_4$ and assigning the C(t) to be equal to C(t−1), activity A1. Notably in this case, because the change in provisional status from A1 to A2 did not persist for longer than the hypsometric interval, the current status remained unchanged from A1 between $t_3$ and $t_4$.

For times between $t_4$ and $t_5$, the provisional status P(t) remains unchanged and furthermore the change initially determined at t=$t_4$=t' continues to persists for a duration longer than $T_h$. Thus, the method 200 loops between Blocks 202, 204, 206, 214, and returns to Block 216. Over this time interval, times $t_2$ to $t_3$, the conditions of case b) are satisfied. Therefore, the current status, C(t) is assigned to be equal to, C(t−1), activity A1.

At time $t_5$, the method 200 determines that the provisional status has changed from A1 to A3. As described above, the method 200 follows Blocks 202, 204, 206, 210, and 212, noting t'=$t_5$ and assigning C(t) equal to C(t−1), activity A1.

For times $t_5$<t<$t_6$, the provisional status P(t) remains unchanged, activity A3. Furthermore, the method 200 determines that the change in P(t) recorded at t'=$t_5$ persists for a duration less than $T_h$. Thus, the method 200 loops between Blocks 202, 204, 206, 214, and 220 for this time interval and continues to assign C(t) equal to C(t−1), activity A1.

At time $t_6$, the method 200 determines that the change in P(t) has persisted for a duration equal to $T_h$. Thus, the method 200 moves through Blocks 202, 204, 206, and 214, returning to Block 216. In Block 216, the method 200 determines that the conditions of case a) are satisfied and the method 200 updates the current status from A1 to A3. Furthermore, the time assigned to activity A1 over the time interval $t_5 < t < t_6$ is removed (as indicated by X in FIG. 2B) and retroactively added to that of activity A3.

Subsequently, over the time interval $t_{6<t<t7}$, the provisional status P(t) remains unchanged and the change determined at $t=t_5=t'$ continues to persists for a duration longer than $T_h$. Thus, the method 200 follows Blocks 202, 204, 206, 214 and returns to Block 216. Over this time interval, $t_6 < t < t_7$, the conditions of case b) are satisfied and the method 200 continues to assign C(t) equal to C(t−1), activity A3. The method 200 then loops back to Block 202.

In certain embodiments, the vehicle status determined by the method 200 may be stored in memory 130 and used to determine performance parameters such as worker productivity, work time of the vehicle, idle time, shut off time, warm-up time or other useful categorizations of vehicle activity. This information may be further communicated to the interface device 124 of the data delivery system 104 for presentation of the performance parameters to users 126 of the system 100. This information may be sent to the interface device 124 by communication mechanisms including, but not limited to, satellite, cell phone, telephone land line, wireless communication, fiber optics, local area networks, wide area networks, and the Internet The users 126 may include, but are not limited to, equipment operators, owners, financiers, managers and supervisors of a worksite project, as well as engineers and architects and other interested parties who wish to review the performance metrics of a plurality of worksite vehicles. The users may further comprise "local" users, such as site managers, or "remote" users who are spatially distant from the worksite, such as upper level managers who work at a central office or headquarters distant from the worksite.

Figure 3A:
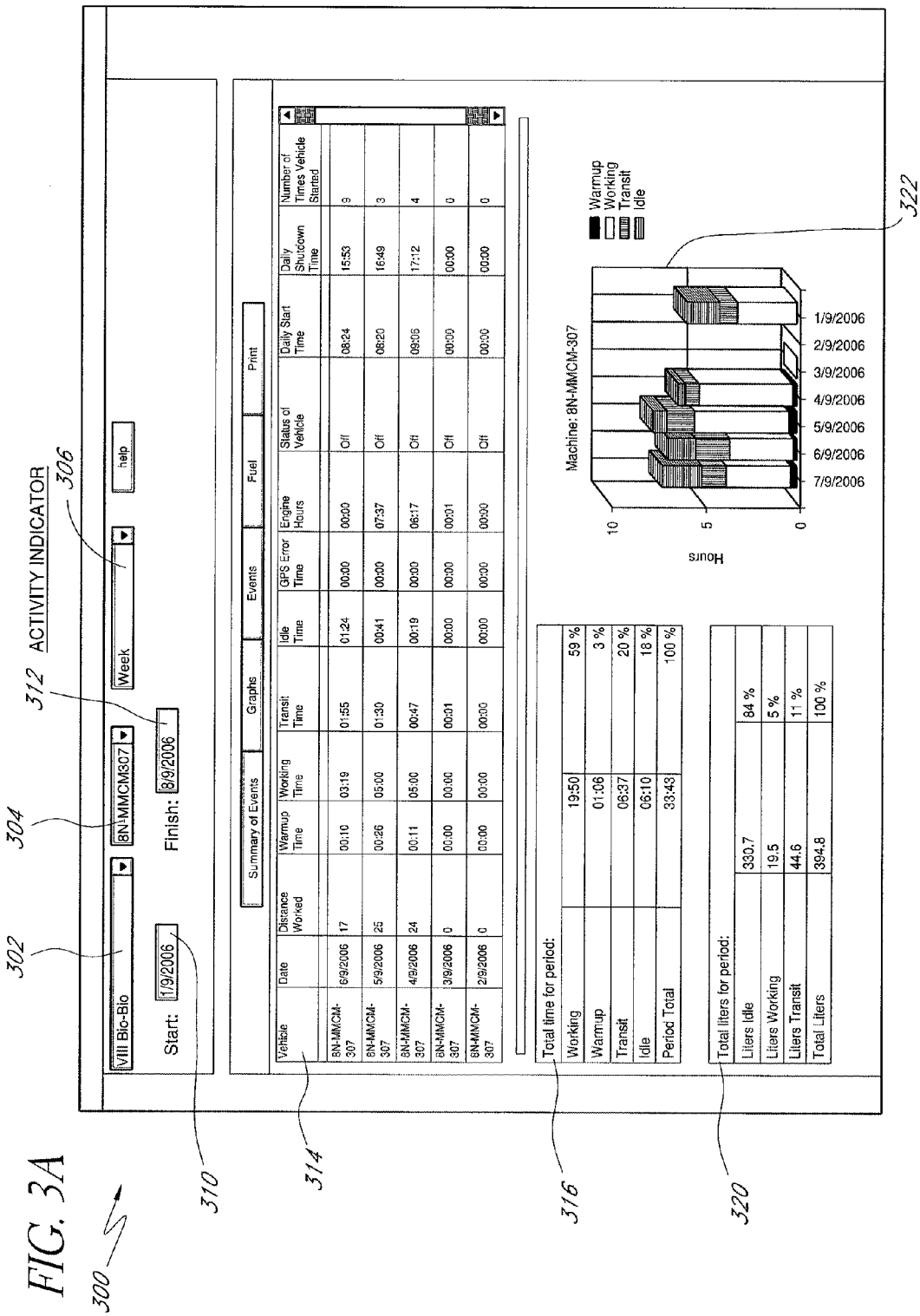
FIGS. 3A-3B illustrate embodiments of productivity reports generated by the productivity assessment system of FIG. 1

In certain embodiments, the interface device 124 allows a plurality of users to submit requests regarding metrics of interests for one or more vehicles for a selected time frame and to receive customized reports responsive to the requests. In one example, illustrated in FIG. 3, the report 300, comprises an electronic document which is generated by the interface device 104 in response to input by the user. The user 126 may specify inputs such as a worksite or workgroup 302, a vehicle name 304, a time period 306 such as a day, a week, a month, or a year, and a start or finish date 310, 312 for the time period. Alternatively, the user may specify an arbitrary time period having a selected start and finish dates 310, 312.

Based on the inputs entered by the user 126, the interface device 124 provides a report containing a plurality of reporting details 314 for the vehicle 110. The reporting details 314 may comprise information such as the vehicle 110, date, distance worked, warm-up time, work time, transit time, total idle time, GPS error time, engine hours, a status of the vehicle 110 at a selected time, such as midnight, a daily start time, a daily shutdown time, and the number of times the vehicle was started. In one embodiment, the interface device 124 may access the vehicle status data stored in the memory 130, which may further access the GIS 122 and GIS database 132, to dynamically generate the report 300. In another embodiment, the interface device 124 may provide a previously generated report, or a summation of previously generated partial period reports, conforming to the user's input parameters. In a further embodiment, the interface device 124 may receive a live feed of vehicle status data directly from the data processing device 116 in order to dynamically generate the report.

In additional embodiments, the report 300 may further comprise a cumulative summary of any of the vehicle statuses determined by the system 100. For example, cumulative totals 316 for vehicle statuses such as working, traveling, warm-up, and idling may be provided. The report 300 may additionally provide summaries of fuel usage 320 calculated for the vehicle 110 on the basis of the consumption of the vehicle 110 for a time period when it is operated in the particular vehicle status. This calculation may be performed for the duration of any of the vehicle statuses recorded by the system 100. In one embodiment, the calculation is based upon the specific vehicle status being monitored. In another embodiment, the calculation is based upon the specific vehicle status being monitored. In a further embodiment of the system 100, the fuel consumption of the vehicle may be calculated on the basis of both the specific vehicle and the vehicle status. Advantageously, the calculation of total fuel consumed using the sum of fuel consumed in particular vehicle and/or status is substantially more precise than general calculations of fuel consumption made according to engine hours. The calculations may be further refined over time to attain a high precision in the calculation of fuel consumption.

Advantageously, such calculations may be further used to isolate theft or engine malfunction. A difference may be calculated between the calculated fuel consumed and the fuel requisitioned by a particular vehicle 110. Subsequently, when auditing a group of different vehicles 110, those vehicles 110 exhibiting the greatest differences may be identified for heightened scrutiny. Beneficially, this analysis allows for efficient targeting of auditing resources toward the greatest apparent fuel disappearance problems. In this way, management may send a signal to the workforce that it is both directed toward the greatest problems and sequentially working down the list toward smaller violators. Thus, by auditing the most serious violators, and providing input for the operators to speak among themselves about the fuel consumption monitoring, the system 100 may result in significant reductions of the misappropriation of fuel, while minimizing the cost of auditing and friction generated within the workforce through direct confrontation of many individuals.

The report 300 may further provide the vehicle status information in the form of graphs 322. Such graphs 322 may facilitate explanation of the results to vehicle operators and managers. For example, the graph 322 may comprise a bar graph for the selected vehicle 110 where each bar of the bar graph represents a cumulative total of each status for a selected time period, such as a day, a week, a month, a year, or an automatically selected time period for the end user 126. The bar graph may be further color coded by status for easy viewing and comprehension. For example, the color green may represent a vehicle status time which is good and that more of time spent in this status is desirable. In another example, the color yellow may represent vehicle status time for which small amounts are acceptable but should be limited, such as idling. In a further example, the color blue may represent, vehicle status time which should be discussed, such as the traveling status. In light of such discussions, transitions within and between jobs could be reduced by either improved management and scheduling, or a reduction in personal use of vehicles by the operator. In an additional example, the color red may represent a vehicle status time with specific limits which should be adhered to, such as the warm-up status, instead of the casual, unregulated startup time which commonly occurs in the industry.

Advantageously, these graphs 322 may facilitate an understanding of how the total vehicle operating time over a selected period is divided up amongst the determined vehicle statuses. Furthermore, by comparison of the cumulative time the vehicle 110 spends in each of the vehicle status with relevant benchmarks, it may become clearer what improvements may be necessary to improve productivity of the worksite. Such improvements may comprise more operator time on the job, dedication to the job, a reduction or re-scheduling of maintenance time, and replacement of older, maintenance-intensive equipment. In one example, there is a high correlation between the time of first startup in the morning and the appearance on the job of operators. Thus, should vehicles 110 be found to routinely start at 11:00 in the morning and the total number of hours worked is low, as observed in the report 300, it is clear that operators should be beginning work more early. Conversely, should the vehicles have a low number of work hours and the last equipment shutdown characteristically occur at 3:00 PM; similarly observed in the report 300, working longer hours in the afternoon is indicated.

In one embodiment, the cumulative time a vehicle 110 is determined to be working may be compared to a selected time period, such as the length of a work day, to calculate a working performance parameter. Such a comparison may be used to determine whether the vehicle 110 is being used an acceptable fraction of the work day. Similar comparisons may be made using shorter or longer periods of time. For example, the performance of the vehicle 110 may be examined during portions of the day where operators are not under direct supervision. Such comparisons may allow a supervisor to determine whether operators utilize the vehicle 100 at acceptable levels when "out of sight."

Beneficially, measured work hours may be utilized as the parameter by which payment for the services of the vehicles 110 is calculated. This is in contrast to the currently used parameter in the industry of "hourmeter hours," which may be significantly different than the actual amount of work performed. Using work hours instead of hourmeter hours for payment, payment amounts can be more precisely tied to the number of work hours performed, providing significantly improved parameter for the work actually performed. Such targeting of payment to work hours may significantly stimulate the productivity of the machinery over a given time period, and thereby reduce the cost of operation per hour.

There will always be a party responsible for the cost of contracting of heavy equipment to perform services to who will accrue the benefits of superior productivity. It is this entity which feels the responsibility, authority, and motivation to instigate changes.

There are two common types of contracts, the "fixed contract" and the "time and material" contract. In the "fixed contract," a price is established in advance to move a selected number of cubic yards of earth from a first position to a second position. In this case, it is the earthmoving contractor who assumes the responsibility to move that earth and who is financially motivated to maximize work and minimize downtime. For example, the contractor may pay bonuses for high numbers of work hours and provide sanctions for low numbers of work hours. Additionally, in this type of contract, the entity paying the contractor is not concerned, for their cost is contractually fixed.

In the "time and material," contract, a number of machines equipped with fuel and operators are rented at an hourly rate, typically measured by the hourmeter or shift. The entity hiring the equipment would prefer to pay per productive hour, instead of the current system of paying for hourmeter hours and absorbing the inefficiencies. The heavy equipment contractor, however, is not concerned as to the number of inefficient hours spent on a job measured by the hourmeter, and may in fact gain economically from the creation of additional unproductive hours.

Thus, payment for work hours, instead of hourmeter recorded hours, creates a more effective situation of matching the authority over the operation of the equipment with responsibility for operating it efficiently. The burden of minimization of idling, transport and warm-up time, while maximizing work hours, is placed on the owner/operator/contractor of the heavy equipment; who is directly capable of initiating actions to optimize these variables.

In an embodiment, a system for the calculation of the number of work hours and hence amount of payment corresponding, is provided using report 300. The amounts of work hours to be paid for or for which bonuses are to be paid to operators is determined from the measurements of machines made by the system 100 and summarized in the report 300. Payment may be further calculated by a third party, uninvolved in the direct relationship of payor and payee, for the specific task.

In another embodiment, the cumulative time a vehicle 110 is determined to be idling may be compared to a selected time period, such as the length of a work day, to calculate an idling performance parameter. Idling is a status which undesired for a number of reasons. In one aspect, idling burns valuable fuel and creates wear and tear on the engine, without work being performed. In another aspect, idling emits combustion gases which may damage the environment. In a further aspect, idling time diminishes the resale value of the vehicle 110, as high hour equipment has a lower resale value than corresponding equipment with a lower number of hours on the hourmeter.

In an embodiment, idling percentage targets can be created to reduce the amount of equipment idling. With ongoing measurement of idle time, bonuses can be paid for operators who achieve significant and sustained reductions. Likewise sanctions can be applied to operators who continue to have high amounts of idle time.

Measurement of the cumulative time a vehicle 110 spends idling may also allow supervisors to determine when operators are misrepresenting their time spent working. For example, in conventional systems, hours of work time are recorded with no mechanism to distinguish what fraction of the recorded "work" hours are spent idling. This situation creates opportunities for operators to record hours of work which were, in fact, spent idling.

In another example, idling may be used as a cover for stealing fuel. For instance, an operator may requisition fuel for the stated purpose of working, which may consume fuel at a rate of about 9 gallons/hour, while in fact spending time idling, which may consume fuel at a rate of about 2 gallons/hour. Thus, deliberate idling creates a surplus of fuel which may be sold or used to work on unauthorized side projects. In embodiments of the present disclosure, however, the idling time may be distinguished from the total hours the vehicle is working, providing a cross-check on operator reported work time and fuel requisitions.

Measurement of the cumulative time a vehicle 110 spends in all statuses may be further used to detect problems with the hourmeter of the vehicle 110. For example, by comparison of the hourmeter readings and total time measured for all vehicle statuses, discrepancies in timekeeping, owing to tampering or other malfunctions, can be identified and investigated.

Measurement of the time a vehicle 110 spends warming up may be compared to a selected time period, the number of minutes specified by the manufacturer, to provide a warm-up performance metric. Such totals and/or performance parameters may allow supervisors to determine whether vehicles 110 are being operated according to the manufacturer's specifications. For example, when using heavy machinery, such as the vehicles 110 of the present disclosure, manufacturers typically recommend that operators observe a specified engine warm-up time. In this startup time, the vehicle 100 idles immediately after engine startup, allowing time for elements of the engine to reach operating conditions before work is begun. For example, engine coolant and oil may need to circulate through parts of the engine to ensure proper operation. Failure to consistently allow the vehicle 110 a proper warm-up time may cause undue stress on the engine and necessitate more frequent maintenance, and premature obsolescence, than would other wise be necessary.

Measurement of cumulative time the vehicle 110 spends in travel may be compared to a selected time period, such as the length of a work day, to calculate a traveling performance parameter. Such cumulative times and performance metrics may allow supervisors to determine if travel is accounting for a higher than expected fraction of the vehicle's total operating time. If such is the case, the supervisor may revise the travel routes employed by the vehicles, eliminate the use of the vehicle 110 for personal operator transport, or improve the programming of the machinery to thereby lower the total travel time.

Figure 3B:
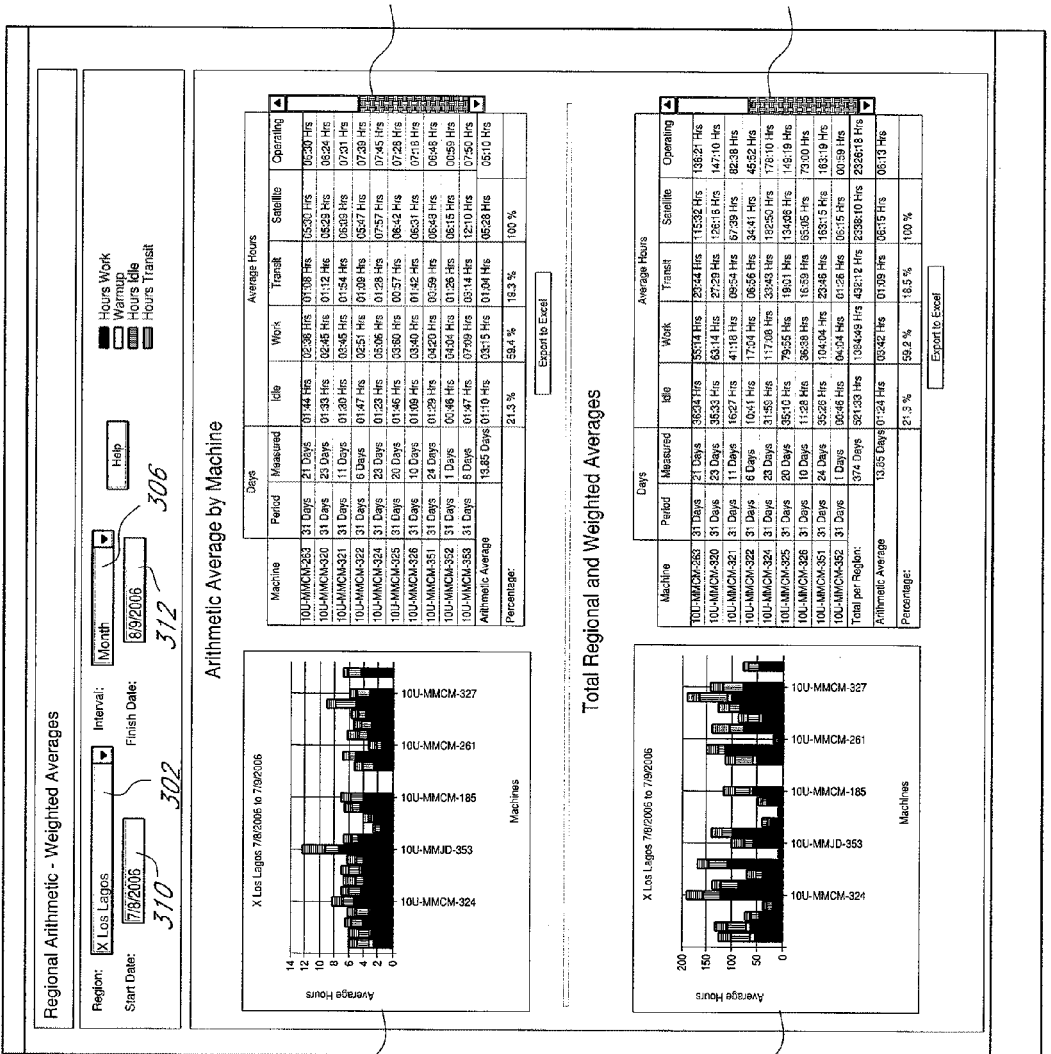

In another embodiment, FIG. 3B further illustrates how the vehicle status data may be used to assess productivity of vehicles 110. A group of machines may be displayed on a multiple machine report 324 which presents arithmetic means and weighted averages of the times determined for the various vehicle statuses. In one aspect, the means and averages may be used as benchmarks against which the activity of the vehicles from a single vehicle or worksite may be compared with another. In another aspect, the means and averages of a first worksite may be compared with those of a plurality of other worksites to infer the relative productivity of the worksite. In a further aspect, such means and averages may compared with means and averages measured at different times to gain an appreciation for changes the cumulative vehicle status over time.

The multiple vehicle report 324 is provided by the system 100 in response to inputs from the user 126 in a manner similar to the single vehicle report 300. For example, the user 126 may specify inputs such as the worksite 302, the time period 306 such as a day, a week, a month, or a year, and a start or finish date 310, 312 for the time period. Alternatively, the user 126 may specify an arbitrary time period having a selected start and finish dates 310, 312. The resultant vehicle status data for the arithmetic average and weighted average may be presented in both a detailed breakdown 326, 330 of each, respectively, as well as a graphical form 332, 334.

The summed number of measured work hours demonstrated in the report 324 may also be used as a basis for payment for services. In one aspect, this method of payment may create higher efficiencies of operation than the use of summed hourmeters for payment. This higher efficiency is due to the better calibrated match of authority over the equipment, and the responsibility for the financial effects.

In one embodiment, the vehicles 110 performing services for an earthmoving project may be grouped and their work hours 326, 330 summed at any point during the project, as illustrated in the report 324. In this manner, comparative metrics, both calculated as weighted and arithmetic averages, useful during the project to provide benchmarks for individuals and sub-groups to aspire to, are available at any time. For example, the work, idle, transit, and warm-up metrics, as well as other useful metrics for comparison of any one vehicle 110, may be viewed for analysis at any time during the project. Such analysis may assist in identifying best practices and encouraging other vehicle operators to follow that example. Likewise, low productivity operators may be identified with the same analysis, allowing them to be isolated, worked with intensively to improve their performance, and, as a last resort, separated from the project if they are unable to conform to project benchmarks. Additionally, payment for the work hours of the vehicle 110 may be based on the number of calculated work hours, as well as productivity bonuses for operators. It may be understood that the above described methods of benchmarking and payment may be applied to a variety of other fields involving the use of equipment, whether manned or unmanned, such as forestry harvesting, without limit.

While the above embodiments have described a system 100 in which the analysis of the vehicle data is performed using the data processing device 116 and association database 120 of the data delivery system 104, in alternative embodiments, the analysis may be performed by the data collection system 102. For example, the data transmission device 112 may be provided in communication with the association database 120, where the database may be either incorporated in the data collection system 102 or in the data delivery system 104 In further alternative embodiments, the data transmission device 112 may be provided in communication with a GIS database 132 which contains all necessary reference data and storage capacity to allow the data transmission device 112 to perform the analysis functions of the system 100.

In further embodiments, a data transmission device 112 configured for data analysis may comprise an ORBCOMM satellite communicator, such as the Panasonic 7101, Delphi 300, or Stellar ST2500. In further alternative embodiments, the data processing may occur on another processor of the data collection system 102 having sufficient speed and capacity for the analysis of the vehicle data.

Whether the vehicle data processing is performed on the data collection system 102 or the data delivery system 104 depends on a number of factors. These factors may include, but are not limited to, the communications bandwidth available to the system in light of the locations of the data collection and delivery systems 102, 104, the cost of that bandwidth, and the data processing and memory capabilities of the data collection system 102.

In one example, the data processing may be performed entirely by the data delivery system 104. Such a case may arise when the data collection system 102 is configured to deliver the measured vehicle data (position, time, and optionally engine parameters) to the data delivery system 104 at intervals which are sufficiently short as to provide a picture of the current status of the vehicle 110. This situation further presumes relatively inexpensive bandwidth.

In another example, the data processing may be performed entirely by the data collection system 102. Such a case may arise when bandwidth is relatively expensive and continuous transmissions are economically or physically infeasible. Thus, assuming sufficient computing and memory capabilities, the data collection system 102 may store the vehicle data and use a component, such as the data transmission device 112, to analyze the stored vehicle data at periodic intervals.

Subsequently, at a convenient time, the data collection device 102 may upload the analyzed data to the data delivery system 104 for storage in memory 130 and report generation for users 126.

In further embodiments, the data processing may be performed by data processing devices which are in communication with at least one of the data collection system 102 and data delivery system 104 but housed in neither.

In further embodiments, the functions of the data processing device 116 and GIS 122 may be performed on vehicle data which is stored in GIS databases 132. Such data may comprise vehicle identification, velocity (or positions from which velocity may be calculated) with sufficiently small and regularly spaced intervals of time between records, and, optionally, engine parameters or other state variables relevant to the determination of whether work has been performed, in what amount, and in what quality. In general, the smaller the time interval between records, the higher quality the work or other state analysis which may be done. Furthermore, the more regularly spaced in time the data points, the more statistically relevant the data points and hence the higher quality the results.

In further embodiments of the system 100, the determination of vehicle status may be combined with geographic information systems (GIS). GIS comprise systems configured for capturing, storing, analyzing, and managing data and associated attributes which are spatially referenced to the earth. So configured, the system may provide the user 126 with "GIS reports" 400 in which vehicle status determinations are cross-referenced with geographic information about a selected worksite and surrounding area. As described in detail below, the GIS reports place the vehicle status into a geographic context, providing managers and supervisors with a report from which additional insights may be gained.

In one embodiment, the user 126 generates a GIS report by providing the system 100 with at least one of a time period, a vehicle 110, a vehicle status, and a worksite area. For example, in order to obtain a working performance parameter, the working vehicle status may be selected for a worksite.

In one embodiment, the worksite area may comprise a line representing a road, pipeline or other linear feature or portion of a job. In situations where the GIS report is updated in real time, at each moment the system 100 determines that the vehicle 110 is in the working status, the report is plotted, thereby forming a point for each report. The precision of this point, and thus the work area, is the precision of the sensor 106. As additional points are subsequently and sequentially created, these reports may be plotted or visualized as creating a line on a map. The precision or error of this line will also be the precision of the sensor 106. In certain embodiments, a time may be maintained with the reception of each point for hyposometric interval changes, if necessary. The vehicle position data as a function of time is recorded in memory 130 and analyzed by the data processing device 116 and may be written to the GIS database 132.

In alternative embodiments, the worksite area may comprise an area. In situations where the GIS report is updated in real time, at the first moment the system 100 determines that the vehicle 110 is in the working status, a timer is started. The vehicle position data as a function of time is recorded in memory 130 and analyzed by the data processing device 116. The analysis is performed to determine the maximum latitude, minimum latitude, maximum longitude, and minimum longitude of the vehicle 110. These quantities are referred to herein as max_lat, min_lat, max_long and min_long. The analysis further records a running tally of the time that the vehicle 110 spends in the working status.

At the end of a selected time period, for example, about an hour, the max_lat, min_lat, max_long and min_long, together with the accumulated work time, are used to generate the GIS report. The maximum and minimum latitude and longitude data are employed to identify two pairs of coordinates, max_lat, max_long and min_lat, min_long which are spatially expressed as the two points at the opposite corners of a rectangle. These two diagonal points may be expressed either as latitude-longitude, where they will form a rectangle, or in whatever other topographic grid system.

In alternative embodiments, the analysis may be performed on vehicle data which has been earlier collected and stored. Otherwise, however, the analysis is performed in the same manner as in the real time feed. It may be further understood that, while lines and rectangles are discussed in the context of worksite areas, in further embodiments, the worksite area may comprise any shape, where the original latitude longitude rectangle will be expressed as a quadrilateral.

This GIS work report 400 expresses the line or area over which the vehicle is determined to perform the selected status. The report 400 further employs visual indicators such as colors, shading, and patterns to indicate the efficiency of the vehicle during the selected time period. For example, the efficiency may comprise the total number of minutes recorded for a selected status over a first selected time period divided by a second time period, a reference standard, in minutes. For example, the efficiency may comprise the number of minutes worked in one hour divided by one hour. In another example, the efficiency may comprise the number of minutes work in one hour divided by 45 minutes. This latter example may be appropriate for new workers who are judged on a more lenient standard than experienced workers. This information may be stored in at least one of the memory 130 and a GIS database 132.

Figure 4A:
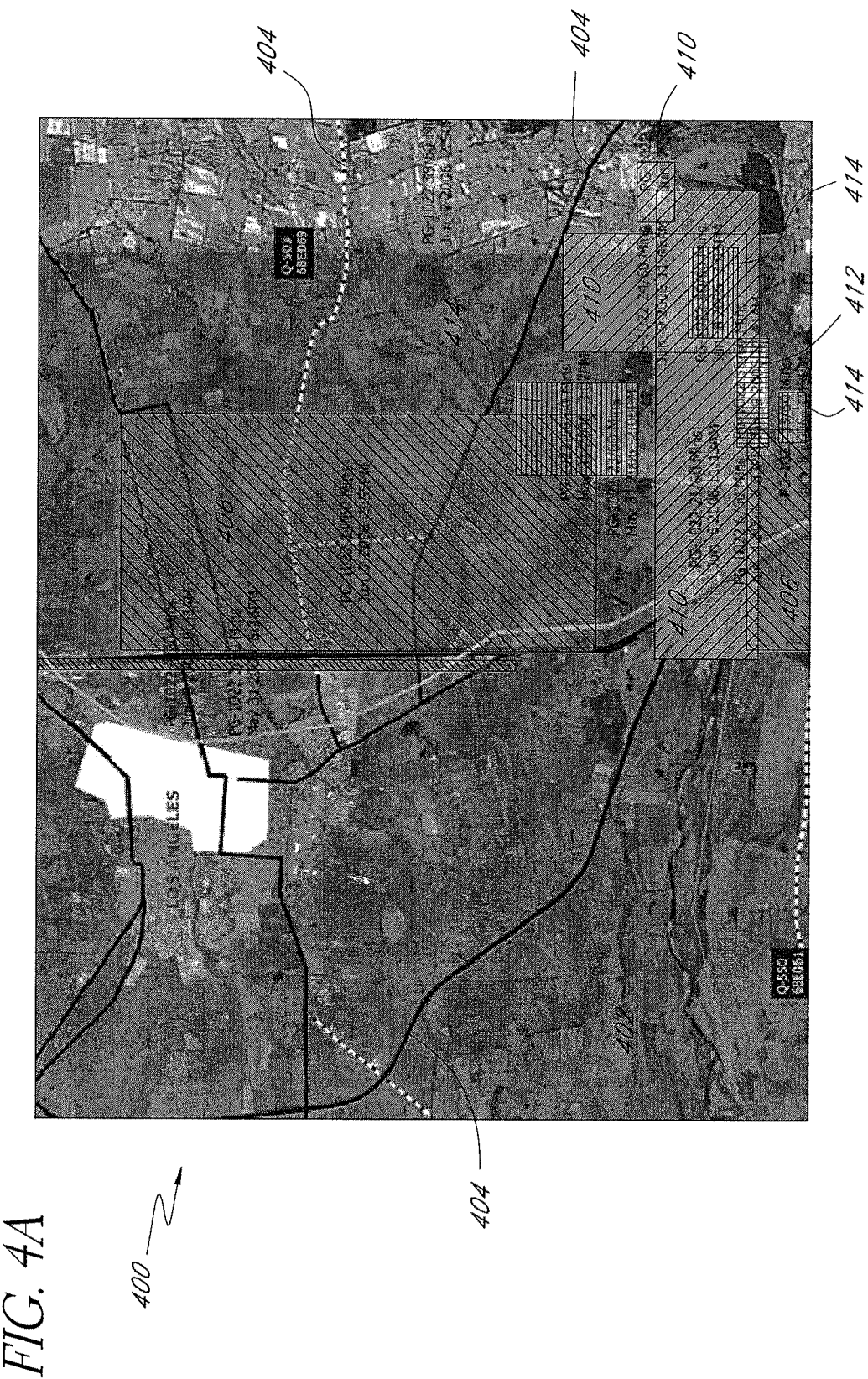
FIGS. 4A-4D illustrate embodiments of GIS reports generated by the productivity assessment system of FIG. 1, utilizing both position reporting data as well as GIS and work area data.
Figure 4B:
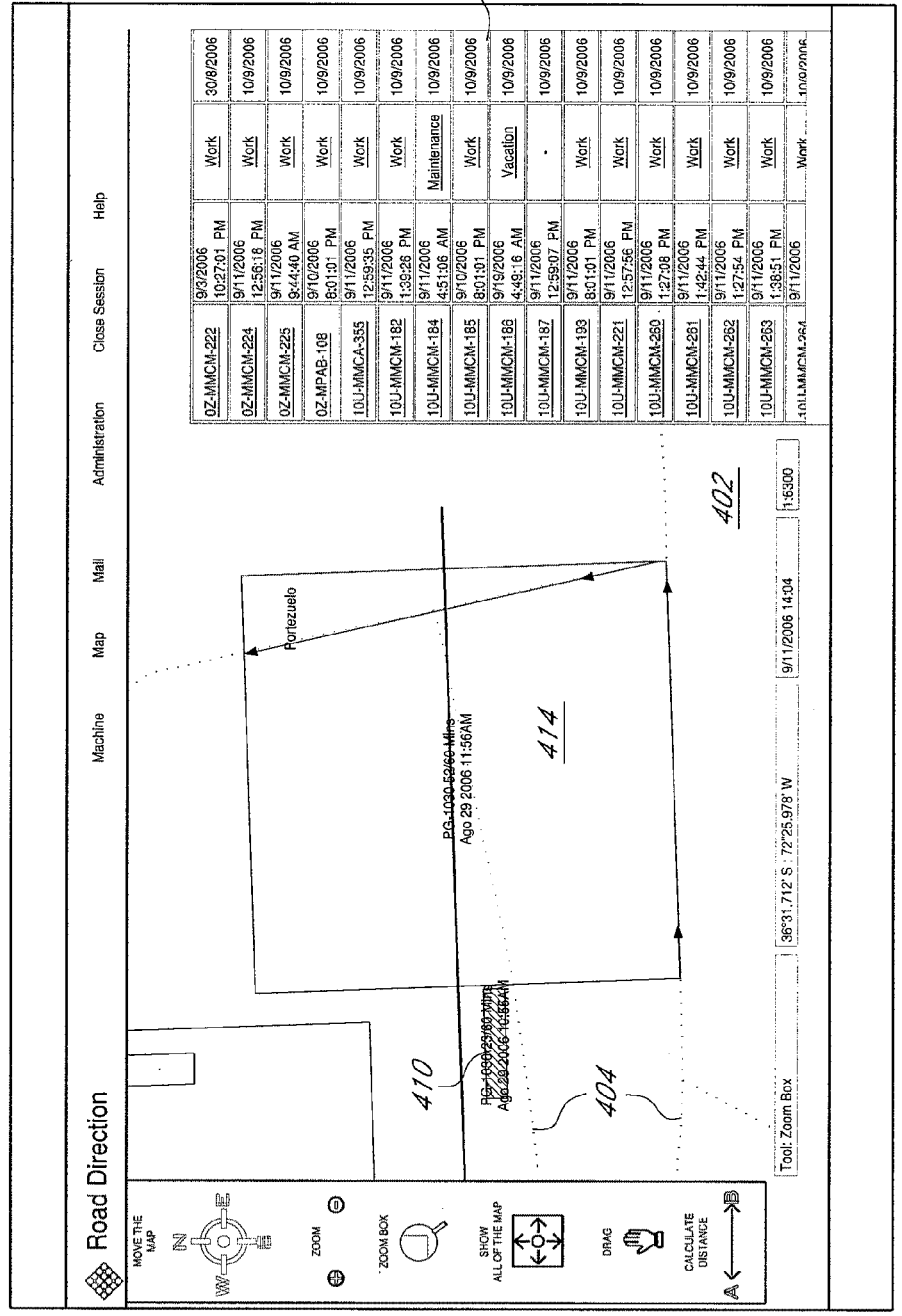

Examples of the GIS report 400 are illustrated in FIGS. 4A-4D and FIG. 5. In one embodiment, illustrated in FIG. 4A, the report 400 comprises a map 402 illustrating geographic features which are representative of a selected geographic region. These features may include, but are not limited to, natural structures such as mountains, hills, rivers, forests, fields, etc. The features may further comprise man-made structures such as buildings, roads 404, bridges, dams, etc. The map 402 in certain embodiments may comprise a satellite map (FIG. 4A), a topographical map, or a schematic map (FIG. 4B). In further embodiments, the report 400 may allow the user to switch between different types of maps 402.

In additional embodiments, a plurality of maps 402 may be stored locally within the system 100 or remotely. For example, maps 402 may be stored locally within in the memory 130, may be stored in the GIS 122 or GIS database 132. Remotely stored maps 402 may comprise maps 402 which are obtained by the system 100 from public or private image or vector mapping databases through a communications link. Examples of publicly available maps 402 may comprise satellite imagery from Google® Earth or Microsoft® Virtual Earth, and freely distributed geographic data from NASA World Wind, Terraserver, and the various vector databases provided by governmental mapping agencies.

In an embodiment, a plurality of status areas 406, 410, 412, 414 are also superimposed over the map 402 in order to allow the user 126 to view the vehicle efficiency in the context of the worksite geography. As illustrated in FIG. 4A, each of the areas 406, 410, 412, 414 may be coded to indicate an efficiency for a selected vehicle status, as discussed above. For example, a first plurality of areas 406 may be colored red to indicate poor productivity, such as less than about 15 minutes of working status determined for an hour of vehicle operation. A second plurality of areas 410 may be colored orange to indicate better but still poor productivity, such as between approximately 15 to 30 minutes of working status determined for an hour of vehicle operation. A third plurality of areas 412 may be colored yellow to indicate below average productivity, such as between about 30 to 45 minutes of working status determined for an hour period. A fourth plurality of areas 414 may be colored green to indicate good productivity, such as about greater than 45 minutes of working status determined for an hour of vehicle operation. The areas 406, 410, 412 414 may be further accompanied by text indicating at least one of the vehicle 110, the date, and the total number of minutes worked in the selected time interval. As further illustrated in FIG. 4A, areas of work performed at different times and/or days may overlap. It may be understood that the areas 406, 410, 412, 414 are illustrated for example purposes and greater or fewer areas may be provided without departing from the spirit of the invention.

The map 402 may be further combined with detailed information 416 on the vehicle status as a function of time to further ascertain the vehicle workflow. For example, FIG. 4B illustrates work performed by a single vehicle over two, sequential, one hour increments. The small area 410 represents the first hour while the large area 414 represents the second hour. It may be observed that the small area 410 is a relatively unproductive area which may be colored orange, having approximately 23 minutes of work performed within a first hour period. It may be further inferred that this work is likely associated with moonlighting, as the area 412 does not overlap with any road 404 or other construction site. The large area 414 represents a productive area having approximately 52 minutes of work performed in a second hour period.

The visual indicator associated with area 414, as well as the timing of the vehicle statuses received, allows the user to determine the flow of work represented by the area 414. Work began in the lower left corner of the area 414, on the road, establishing the west-most and south-most limits of the area 414. The work proceeded rightwards, along the road to the intersection at the lower right corner of the area 414, establishing the eastern-most limit of the area 414. The work then proceeded along the northern road to the northern limit of the area 414. The northern limit represents the end of the one hour period and the report is closed.

As illustrated above, embodiments of the GIS reports 400 enable the plotting of where precisely work occurs, within the tolerances of the sensor 106 used. Furthermore, such plotting may be utilized whether on a micro scale of of construction drawings for one small project or on larger scale regional or national level construction project such as maintenance of a national rural road system, using vector based mapping or imagery. Additionally, it is possible to determine whether the vehicle 110 is performing work in authorized locations. For example, in the case of road maintenance equipment shown in FIG. 4B, it is possible to differentiate between work actually done on the road system and work done for the owners of private roads or accesses.

Figure 4C:

The embodiment of FIG. 4C illustrates another example of using the GIS report 400 to assess worker efficiency. A plurality of geographic areas, 420, 422, and 424 are shown with respect to a work area comprising a road 404. The geographic areas represent areas in which work has been determined to be performed by the vehicle 110 over approximately 60 minute intervals, as discussed above. Furthermore, geographic area 420 was recorded first, then area 422, then area 424. In this embodiment the vehicle 110 comprises a rural roads motor-grader. In certain embodiments, one or more positions of the vehicle as a function of time may be further included in the report to establish chronology.

As illustrated in FIG. 4C, the small area 420 is of relatively high productivity having 46 minutes of work. It may be further observed that area 420 does not contain elements of the work area, are represented as dotted 404 and solid lines in the embodiment. From this observation, it may be inferred that the work represented by area 420 was not part of the project which is defined by the road 404 and, therefore, was unauthorized. The remaining 14 minutes of the hour report may be presumed to be either in transit or idle status. Whether this unauthorized work represents a road which the employer should have included in the defined project, or represents improper use or "moonlighting" of the equipment by the operator requires investigation by management.

In one example, management may investigate the area 420 and determine that the work performed, while not specifically authorized, proved necessary or beneficial. Furthermore, on this basis, management may reward the employee for a superior job of determining the needs of the public. Management may further incorporate the lessons learned from this experience to better define project work.

In another example, management may investigate the area 420 and determine that the work was "moonlighting." On this basis, management may then sanction the operator appropriately.

As the areas 420 and 422 are contiguous and reported sequentially in time, it may be inferred that, at a point along the boundary of 420 and 422, the time interval over which area 420 was monitored closed and the two points determining the area 420, along with the number of minutes of work, were written for transmission to at least one of the databases 120 and 132.

The large, area 422 is of below average productivity, having about 32 minutes of work determined in an hour of vehicle operation. It can be seen in FIG. 4C that area 422 contains a portion of the work area road 404. The motograder monitored in this embodiment, where only work status minutes are accumulated, may be presumed to have been in either a transit or idle status for at least a portion of the remaining 28 minutes of the period. It may be further inferred that the work occurred principally, if not entirely, on the road 404. This inference is confirmed by comparing the southerly termination of the area 422 with the road 404, which was the most southerly point reached within the range of work velocity, during the duration the work represented by area 422. The maximum north, south, east, and west limits of the vehicle's movement at working velocity during the hour create a rectangle (or alternatively, a quadrilateral figure in the case of the use of different geographic projections).

The corners of the GIS work areas, such as 422, typically precisely intersect the road 404, in the case of simple road geometries, if the work occurred on that road network. As observed in FIG. 4C, however, working on the road 404 cannot account for the western and northern boundaries of the area 422, as the road 404 does not intersect these boundaries.

Examining the GIS report 400 in greater detail, a plausible sequence of events may be deduced. From the anterior work area 420, discussed above, it was inferred that there was a road or work area which is not marked on the map on the western boundary upon which work was performed. Thus, it may be inferred that the work area 422 began during transit between work area 420 and 422, providing the western boundary of area 422.

The southern boundary of area 422 was presumably established because the motorgrader was at a work velocity, moving along road 404. It can in FIG. 4C that one segment of the road 404 moves in a southern direction, then a northern direction, with southernmost point intersecting the southern boundary of area 422. Thus, the system 100 registered the southern boundary of the work area as this southernmost point.

Examining the eastern boundary of area 424, it can be seen that the top right-hand corner does not occur on the road network. Thus it may be inferred that the vehicle 110 proceeded on a northeasterly course along road 404 reaching its easternmost point during the hour where the 422 area intersects that 404 road. Understanding that work was subsequently performed in area 424, and that work on the road 404 cannot account for the northern boundary of the area 422, it may be further inferred that the vehicle 110 then turned back toward the northwest on an unmarked road, toward the next work area number 424. Such a road may be visible upon closer examination of the satellite image or a site visit.

Further examining the report 400 of FIG. 4C, it may be observed that the chronologically last area 424 is a productive area, having approximately 50 minutes of work determined in an hour period. It is further observed that the area 424 is entirely off the project road network. Furthermore, the area 424 overlaps with work area 422. This overlap may be indicative of the normal backing and filling of a motorgrader at the time of the initiation of measurement of the area 424 or it may be indicative of a lack of precision in the position measurements. The overlap could also have occurred when the report closed and the motorgrader was returning to the road 404. Comparing the other two work areas with area 424, it may be seen that work which was performed off the project road network demonstrated higher productivity, more work minutes per period, than project work.

There is significant value in making visible information as to what is being done. In one example, whether a worker is working on roads that management has not, but should, include in a project or whether workers are moonlighting provides opportunities to improve the process. Additionally the accumulation of work time per segment of road 404 may be of value to management, for both the auditing of work in process, as well as the estimation of the time and costs required for budgeting future work As discussed in greater detail below with respect to FIG. 5, GIS work reports of shorter duration may be further generated, providing smaller geographic areas which may present more precise and, perhaps more useful, information and detail.

Figure 4D:

FIG. 4D illustrates a further example of using the GIS report 400 to assess worker productivity. FIG. 4D contains a large work area 412 which represents a measurement of the working status for about 44 out of 60 work minutes. In one aspect, it can be seen that the road 404 intersects all side boundaries of the area 412, indicating that the work represented by area 412 was entirely performed on the road. As further determined by examination of the detailed vehicle status data 416, the work began at the southwest corner of the area 142 where the road 404 runs towards the south. The original western-most buffer at the beginning of the hour is not modified, as no other position of the vehicle within the hour is more westward. The southern-most limit, however is updated continuously while the vehicle 110 moves southwards along the road 404. This updating stops when vehicle 110 turns northwards to follow the road 404, heading northeast. The GIS report 400 ends at the northeast corner of the area 412, with the time period ending while the vehicle 110 continues progress to the northeast along the road 404.

In an embodiment, GIS work reports 400 may be created continuously throughout the day, enabling users 126, such as managers, to observe the accumulation of the minutes of work of one or more vehicles 110 on a near real-time basis. Should the user 126 observe poor performance or notably good performance in the reports 400, they may take action to change or reward this performance, as necessary.

In additional embodiments, GIS work reports 400 which do not coincide in space with the road 404 or work area are of particular interest. The lack of coincidence between the report 400 and a road 404 or work area may indicate unbudgeted and perhaps inappropriate work activity which should be further examined. Thus, the GIS work reports may allow managers to observe and rapidly respond to the activity of vehicle operators.

The GIS reports may also allow a user 126 of the system 100 to visually understand the amount of work done on a budgeted project, such as a road 404 or other work area. As described above, the GIS work report 400 allows the amount of work done in a selected time period, for example about one hour, to be projected as a geo-referenced rectangle or quadrilateral figure on a map 402. The figure may be further color or pattern coded to reflect the fraction of the selected time period work was performed.

In certain embodiments, the GIS 122 may be employed to subdivide a work area into very small portions. The work area may consist of the road 404, a particular portion of a construction site or project, or to any graphically representable space-time defined structure to which the vehicle 110 is assigned to work. Line segments may be, for example, between approximately 1 to 100 meters. Advantageously, the precision of the statistical calculation of work applied to a project area is improved through the use of smaller segments or areas.

The GIS 122 may further be employed to determine which of these very small segments of road 404, or other budgeted work area, occur in the same two dimensional space as the GIS work report 400. In certain embodiments, this correlation may be used to calculate the number of seconds per segment or area of work performed on those particular road work areas. For example, the number of working minutes identified in the GIS work report 400 may be divided by the number of work area segments falling within the area of the GIS work report 400 and saved in the GIS database 132, relating in a database record the particular segment of road, the number of seconds or fractions thereof, the machinery performing the work and the date and time the work was done as well as other information which may be usefully associated with the record. These work areas, saved as individual segments with the number of seconds accumulated may be saved in the GIS database 132 and associated with work for a particular contract, a budget year, or for any other time period for which the GIS work reports 400 are available. Again, using reports generated by the GIS 122 processes in conjunction with geometric structures saved in the GIS database 132, road segments can be colored and/or visually graphed by the- number of seconds of work applied to each work area during the time period or job oriented nature of the particular query.

Figure 5:
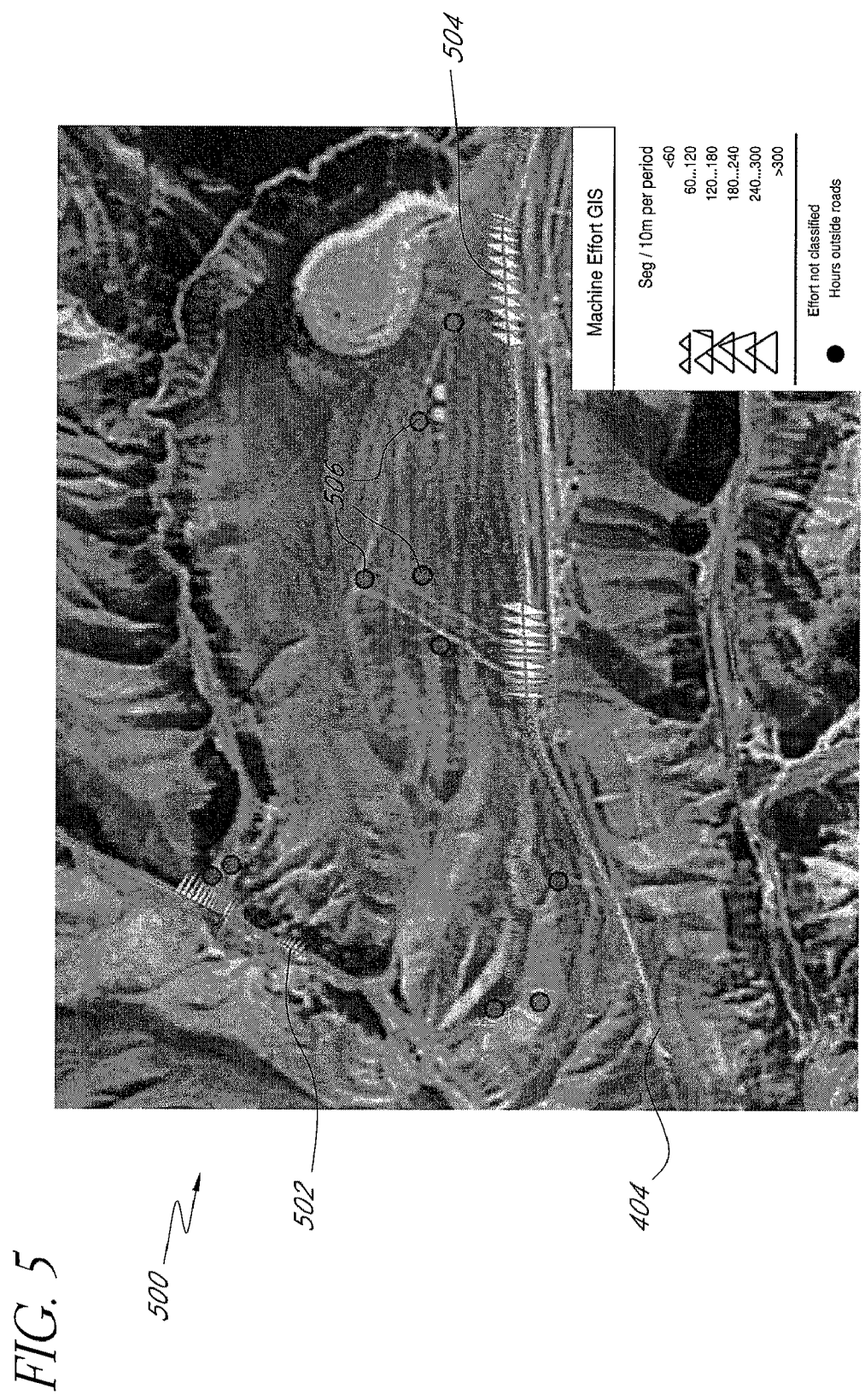
FIG. 5 illustrates an embodiment of a GIS road segment report.

FIG. 5 illustrates an embodiment of a road segment GIS report 500 which is configured to display work performed for selected road segments over a selected period of time. Road segment GIS reports 500 such as this may be useful for a variety of purposes. In one aspect, work intensive areas 502 in a project or road 404, areas where large numbers of machines and times are employed, and have resulted in a large number of seconds per road segment, may be identified visually. This information may indicate where areas 502 which have required high maintenance are located. These areas 502 may be considered for improved road base and/or paving in order to increase the durability of the road 404 and decrease maintenance costs. In further aspects, these work intensive areas 502 may be candidates for a different type of machinery, maintenance programs, and scheduling.

In other aspects, GIS reports 400, 500 may highlight work performed which is not authorized. To address these situations, in certain embodiments, GIS work reports 400, 500 may be processed by the GIS 122 to determine if time spent in the working status to spatially overlap with a work project or if there is no overlap with a project. If the work time correlates with the work project, the working time is applied to the segments or sub-areas of that project in the GIS database 132. Alternatively, if there is little to no correlation, the GIS work area is highlighted for further investigation, as their distance from the budgeted road project may indicate moonlighting. For example, these GIS areas may be illustrated as colored or patterned circles 506 (FIG. 5) in the GIS report 400, 500 to highlight for management the importance of further investigation. The circles 506 represent the geometric center of the work area, or may alternatively be displayed as quadrilateral GIS work areas, as discussed above.

Beneficially, this analysis of where work has been performed with respect to the work area may be used to streamline oversight of work areas. In certain embodiments, GIS reports 400, 500 are generated at periodic intervals, delivered to management users 126 via the interface device, and automatically processed by the system 100 if they intersect substantially with budgeted work areas. In one embodiment, the record for the particular line segment, representing the road segment with the associated seconds of work time, is written to the GIS database 132 for later report generation. These reports may be useful in auditing the amount of work performed, the number of hours of work necessary for a particular length or type of road, or the creation of future estimates for the amount of work which will be required in particular environmental situations or with determined amounts of measured road degradation. In another embodiment, the information may be used in an ongoing real time project management context. Thus, these segments, through the automatic processing and supervisor revision of report 500, received sufficient attention to verify they are properly worked and require less on-site management attention than is currently industry practice In the case of partial concordance between a plurality of budgeted work areas and GIS reports 400, 500, the reports 400, 500 can be brought to a particular alert window. There, the work reports may be required to be signed off by a supervisor as "relevant to the project" or "not relevant to the project," thereby focusing supervisor attention on the identified problem areas.

GIS reports 400, 500 which do not overlay any work area, may be similarly handled, being automatically isolated and brought to the attention of management in an alert window. Work contained in these identified reports 400, 500 may be cataloged by a supervisor as This categorization may, in turn, permit further classification into "not permitted moonlighting," "to be billed to Party X", or "the relevance of this activity must be analyzed and potentially budgeting authority must be established for it." In alternative embodiments, GIS reports 400, 500 may be generated in response to particular events, such as large number of possible moonlighting events. Thus, contractors or managers may identify potential inefficiencies more readily and consider remedies such as such as the provision of appropriate rewards and sanctions, budgeting for these inefficiencies or, alternatively, ceasing work on such projects altogether.

To assist in these determinations, the manner in which the work area and work performed correlate, or do not correlate, may be further refined. In an embodiment, work intensive areas 504 which are part of a budgeted project and are further adjacent sites of potential private projects are identified. This analysis may be employed with respect to either of the GIS reports 400, 500 in order to identify when work performed in these areas 504 may not, in fact, have been performed on the budgeted work area, such as the a road 404 but rather on a private project, such as a private road. Considering the high amplitude of the 504 areas adjoining private property in FIG. 5, a decision could be made centrally to require a supervisor to go out to the worksite and examine the private roads to determine if maintenance services had been performed. Thus, the centralization of information provided by this art may provide efficiencies in the identification of areas requiring further audit and the economical use of those auditing resources.

Once these areas 502, 504 are identified, managers may begin investigate if any problem exists and, if so, address the source of the problem. In one aspect, the problem could be a case of inadequate road drawings, such that operators are becoming lost trying to find the worksite. Querying operators directly on the subject may readily reveal whether this is the case and, if so, better signs and maps may be provided to operators so as to address the problem. The use of GIS productivity quadrilateral figures may then more precisely determine the work area actually worked and allow determinations of whether if offsite work has been performed. In another aspect, the offsite work may be the result of one agency doing work for another. For example, a local mayor may "hijack" state road machinery for use by their municipality. In a further aspect, the offsite work may be the result of moonlighting for adjacent private property owners.

Beneficially, with this information, solutions may be crafted to address unauthorized work. In one example, a solution may be creation of a program, by the responsible agency, to provide private road maintenance services. This approach may further social goals of improving transport networks. For example, the cost of transporting vehicles to the worksite is high and, if the number of jobs to be performed at the worksite is relatively small, then these transportation costs, on a per job basis, are relatively high. In contrast, a large number of small jobs within a defined geographic region may allow road construction vehicles to "do the rounds" and work on the small jobs. Thus, the cost of transporting the machines is spread out amongst many jobs, lowering the per job cost of the road work. In another embodiment, discussed in greater detail below, adjoining private road owners may enter into a website, and click on a map to establish the road sections which they wish to have maintained when the roadgrader is in the area.

In additional embodiments of the system 100, the interface device 124 may be used by peripherally involved project personnel or institutions to request work. Such personnel may comprise road or property owners adjoining existing budgeted road maintenance or subcontractors in a construction project. The system 100 may be configured to elicit preferences regarding a desired time for the work to be performed and sufficient geographical parameters specifying the work requested so as to automatically record the spatial aspects of the requested work, and the desired completion time. The system 100 then can automatically schedule the work, and provide feedback information to the requestor as to the time the work will be actually performed and its cost. Cost quoted may vary according to the importance of the time of work performance to the requestor. Supplementary, sequential updates may further be provided to the requestor to update the expected completion time as the uncertainty is reduced and the work draws closer to the moment of its performance.

In further solutions, on a construction site, it may be more efficient for different contractors to formally use the same machinery, as opposed to the informal arrangements between subcontractors present on many construction sites. With these formal arrangements in place, the GIS reports 500 may provide a measurement of who does what with vehicles 110, bringing greater transparency to the work and its financial costs. This approach may further eliminate double billing for equipment.

Advantageously, the GIS road segment reports 500 may allow for the generation of better budgets and monitoring. Sections of road 404 requiring maintenance, or portions of properties and construction or maintenance projects requiring particular earthmoving operations, can be selected in the GIS database 132 by the user 126. With this selection, the estimated amount of time for completion of the projects may be provided to the system 100 in order to estimate the time per unit of area budgeted. As this work is done, completion can be measured on an hour to hour basis or through summary reports of whatever time period.

Figure 6:
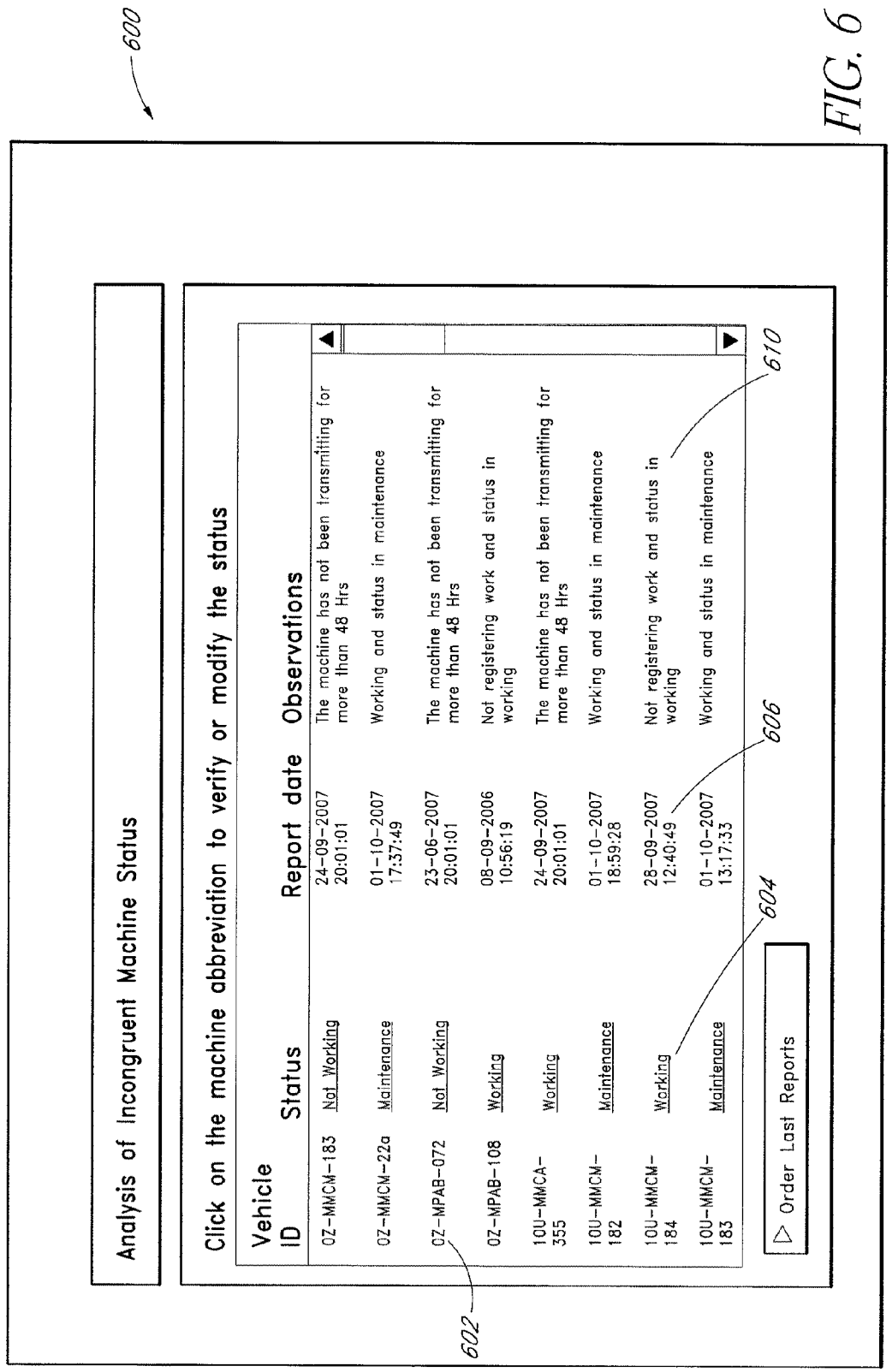
FIG. 6 illustrates an embodiment of a report generated by the productivity assessment system of FIG. 1 which provides analyses of machine status.

In addition to productivity, further embodiments, the system 100 may be used to determine when a service visit to a vehicle is required in order to maintain high quality of service of the system 100. For example, the system 100 may generate reports 600 which detail potentially problematic vehicle statuses (FIG. 6) which may require maintenance. Alternatively, reports may be generated in response to possible malfunctions in, or tampering with, the system 100, as described in greater detail below with respect to FIG. 7. Information conveyed in the report 600 may include, but is not limited to, vehicle 602, vehicle status 604, date of last report received 606, and observations 610. The observations comprise automatic, machine determined comments which are based upon the information contained within the report 600. Access via links 604 may be provided to view a service history of the machine and exception reports generated by the system 100 with respect to a selected machine 110. Examples of observations may include, but are not limited to, working and in maintenance, no transmission for X hours, not registering work and status is working, and intrusion. The report 600 may be placed in the memory 130 for access and update by users 126, such as vehicle management and the providers of the system 100. Decisions as to whether a service call may be generated based upon this interaction between management and the service provider to increase uptime of the system and reduce the number of unnecessary service calls.

In one embodiment, a report 600 may be issued because a vehicle 100 fails to provide status reports 300 on a timely basis. In one aspect, this situation may arise because the system 100 has been disconnected, which would indicate that a service visit is necessary. A manager reviewing such a report 600 may verify the information in the report and order a maintenance team inspect the vehicle or the data processing component 116 may review the report 700 and automatically issue such a request.

In further embodiments, the location of vehicles 110 may be further included in the report 600 so as to infer their status, and hence if a service visit is necessary. In one example, for a vehicle 100 located at a maintenance yard, it may be permissible to not receive transmissions as the system has been disconnected for other maintenance. Similarly, for a vehicle 110 whose last position was outside a storage enclosure which radio waves do not penetrate, the lack of receipt of reports may not indicate that a service call is mandatory. Access by the service provider to management decisions regarding equipment disposition thus provides opportunities to increase quality and decrease the cost of service visits.

As another embodiment, it may be beneficial to provide a single system by which all project participants can share information in order to arrive at a more complete view of the operational reality of the client, and so adjust service. For example, it is inefficient to dispatch service calls when management action has placed a vehicle 110 in storage. In another embodiment, when a vehicle 110 is blocked from transmitting because of a storage location, it is similarly inefficient to dispatch a service call. In another embodiment, management may receive a report that a vehicle 110 has suffered an accident and a portion of the system 100 has been damaged. Thus, a higher quality of system operation can be assured through the timely sharing of information.

Figure 8:
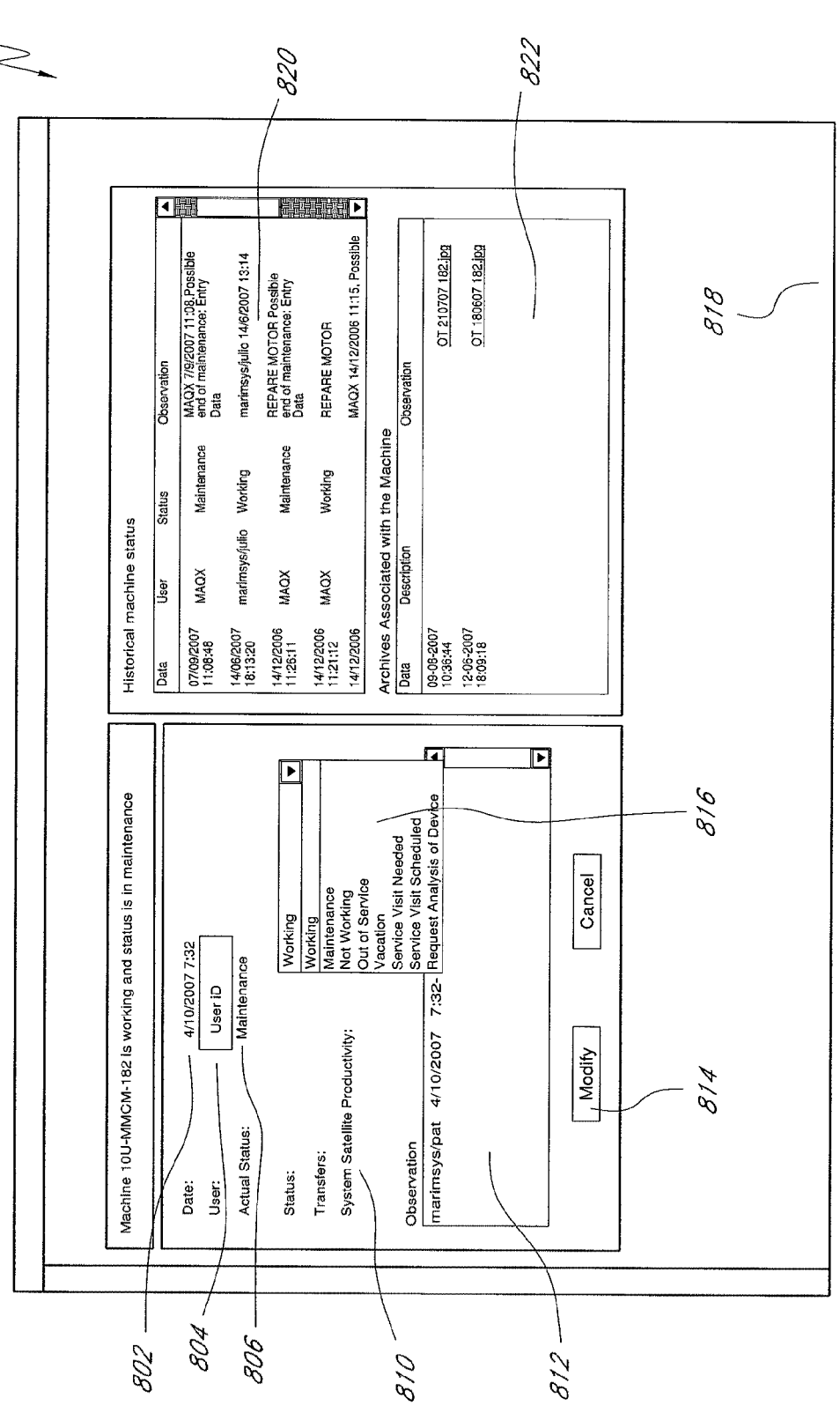
FIG. 8 illustrates an embodiment of an interactive status report.

Such a system, in one embodiment, may comprise a shared workspace platform. The user 126 may employ the workspace platform to gain vehicle status information through an interactive status report 800. An exemplary window 818 of the status report 800 is illustrated in FIG. 8. In one embodiment, the status report 800 may be accessed by selecting the vehicle status in the report 600. Upon opening a status window 818 of the status report 800, there is provided a date 802 at which the status window 800 is opened, a user ID 804, and the current machine status 806. Also provided is at least one measured productivity of the vehicle 810, as discussed above.

The user 126 may perform a variety of functions using the interactive status report 800. In one embodiment, the user may change the status 806 of vehicle 110 through use of a dropdown box 816. Such statuses 806 may include, but are not limited to, working, in maintenance, without work, out of service, operator vacation, service visit needed, service visit scheduled, and request analysis of device 100. Status selections may be made. users 126 comprising employees of the service provider or client personnel. The specific choices available to a user 126, however, will be dependent on a level of access granted to the user 126 on the basis of their affiliation and job responsibilities.

In further embodiments, the interactive status report 800 allows the user 126 to examine a plurality of documents 822 associated with a selected vehicle 110. Such documents may include, but are not limited to, records such as maintenance logs and records of prior vehicle status as a function of time. Past comments on the selected vehicle 110 may be also viewed in a history viewer 820 of the interface 800. Furthermore, current comments, later placed for viewing in the history 820, can be entered in the window 812. Additionally, the user 126 clicks on the button 814 to write any changes in the 800 interface made to memory 130.

Advantageously, the interactive status report 800 provides a mechanism whereby the client and service provider can share information that provides substantially complete view of machine status. As a result, the client and service provider may work more closely together toward achieving high levels of uptime of the system 100. The interactive status report 800 accessible through the link 604, provides a user 126 reviewing the report 600 an area in memory 130 to both query the past history of the system 100, and to enter information which is relevant to its maintenance. Should a failure to transmit be noted without the interactive status report 800, it would be necessary either to contact the client to determine if any changes in status had been generated for the machine 100. It might not be possible to speak to the correct person at the client premises due to their being out of the office or communications range. As such a web available system provides the maximum ease of 126 users for this sharing of information.

In further advantage, the interactive status report 800 may be used to better clarify the nature of errors determined by the system. In another embodiment, the status which caused the report 600 to be generated may be the result of a management decision. For example, in the event that there is no work for a vehicle 110, a manager may order shutdown and storage of the vehicle 110 in order to reduce its battery consumption and risk of theft or tampering. Such a decision may be recorded in the memory 130 and viewable in at least on of the reports 600, 800 as an "exception report." A user 126 reviewing the reports 600, 800 may, therefore, observe both the failure to transmit and the reception of the exception report indicating that the external power source has been disconnected by specific authorization from management. Thus, the report conclusively indicates that the "malfunction" not a result of operator tampering and, therefore, no service call is necessary. Alternatively, the data processing component 116 may review the report 600, verify that management has entered the status report section 604 and registered the machine status as "in maintenance" and thereby determine that a request for a service call is not necessary in light of the shared status report 800.

In another example, a failure to transmit may be automatically noted for a machine that is in work status 610, such as "Does not register work and its state is "Working." An exception report may be further generated indicating that the external power source was been disconnected by management. However without knowledge of this exception report, the disconnection observation, and receipt of an error report regarding failure to transmit, leaves the circumstances surrounding the error report ambiguous. For example the error report may be the result of operator tampering, an equipment malfunction, or by specific authorization from management to disconnect the system.

Under these ambiguous circumstances, there is considerable economic savings in the administration of service to the system 100 to have available the interactive report 800 for the specific 100 machine. The interactive report 800 may accessed through the interface device 124 by a user. Upon reviewing the report 800, it may be determined by a user 126 that the reason for the "malfunction" was not a result of operator tampering or equipment failure but that the machine was been placed off line by management, and, therefore, no service call is necessary. In alternative embodiments, the system 100 may make such a determination automatically. For example, the data processing component 116 may review the reports 600, 800 to verify that management has entered the status report section 604 and registered the machine status as "in maintenance" in the interactive status report 800. Thus, the system 100 may automatically determine that a request for a service call is not necessary.

In additional embodiments, the system 100 may be employed to enhance the safety of workers. Certain professions, such as trucking, must conform to regulations regarding the maximum time an operator may work and the minimum time they may rest. However, operators often attempt to bypass these regulations in order to increase the amount of time they work and increase their profit. This behavior is problematic, as it may lead to tired drivers which cause highway accidents. By employing the embodiments of the system 100, working and resting statuses of a vehicle may be determined and recorded. In the event that mandated working and resting times are not observed, reports may be issued to management to highlight these infractions. Management may then take steps to curb this behavior to better provide for the safety of operators.

As discussed above, the use of the system 100 may tend to evidence operator behavior which is not permitted, creating an incentive to tamper with the system 100. Therefore, embodiments of the system 100 may further comprise a "hardened box" configured to prevent intrusion into the system 100 so as to preserve data integrity and continuity of functioning. In one embodiment, the hardened box may comprise physical barriers around the data collection device 102 which inhibit unauthorized access to the data collection device 102.

The hardened box may further comprise an alarm system 108 in communication with at least one of the sensors 106 and the data transmission device 112 (FIG. 1). The alarm system 108 sends and receives alarm reports should possible intrusion or disconnection events be sensed by the data collection system 102. In an embodiment, the security mechanism 108 comprises a ROM data upload queue to which the alarm reports may be written. The alarm system 108 further communicates stored the alarm reports to the data transmission device 112 for later receipt by the data delivery system 104. These reports contain information which allows the identification of a "trail" that permits reconstruction of possible intrusion events. Operator knowledge of the capabilities of the alarm system 108, and the consequent ability of management to provide negative feedback or sanctions may further assist in creating respect for the system 100 and facilitate the rapid implementation of overall programs of productivity improvement brought about by the system 100.

The alarm reports may be generated under a variety of circumstances which may be indicative of an intrusion event. In one embodiment, blockage or short of a transmission and/or reception signal by the data transmission device 112 may trigger generation of the alarm report. In another embodiment, increased latency data may be reported in an alarm report. For example, the latency may comprise a lapse between the creation of a report and its transmission by the data collection system 102 to the data reporting system 104. In a further embodiment, an alarm report may comprise collection and re-transmission of error reports issued by the sensor 106 and the data transmission device 112. In other embodiments, an alarm report may be generated by disconnection of the internal serial/TTL communications circuit of the system 100. In an additional embodiment, an alarm microswitch may issue an alarm report to indicate the opening of the hardened case on the vehicle 110 which houses the data collection system 102. In a further embodiment, the connection or disconnection of an external power supply to the data collection system 102 may result in the generation of an alarm report. In another embodiment, the startup or reset of the data collection system may trigger the generation of an alarm report, as the system 100 is designed to be "always on" and startup or reset indicates that the system 100 has been shut down for some period of time.

And while benign reasons may exist for at least some of the events above, such as failure of the data collection system power supply, the sensor 106, the RX/TX antenna systems, any entrance into the case may be forbidden to all but authorized support personnel. Thus, should intrusion in the case occur and direct interference with the ROM be encountered, it is probable that vandalism or a direct attempt to defeat the functionality of the has system occurred.

Within the hardened box, the data collection system 102 may further comprise an internal battery backup of sufficient capacity to complete several report transmissions by the data transmission device 112. The data transmission device 112, the alarm system 108, and other electronic components of the data collection system 102 necessary to execute these report transmissions are directly fed by that internal battery backup. The battery is charged or fed by the exterior power supply, when present. This architecture provides that there is a window of system operation should the exterior power supply be disconnected, the case be forced and the interior power connections be interrupted.

During this time window, the data collection system 102 prepares alarm reports. In an embodiment, in order to allow reconstruction of the events of the intrusion, the alarm reports may be provided sequentially which are committed to the ROM memory data upload queue for transmission. For example, an alarm report indicating exterior power supply disconnection may be followed by an alarm report indicating case opening. Should the RX/TX circuit of the data transmission device 112 be intact, the alarm reports may be transmitted immediately upon generation. Alternatively, in the event that the TX/RX antenna has been disconnected, the stored alarm reports may be transmitted at a later date when a serviceable antenna or data output connection and power supply are restored to the data collection device 102.

Figure 7:
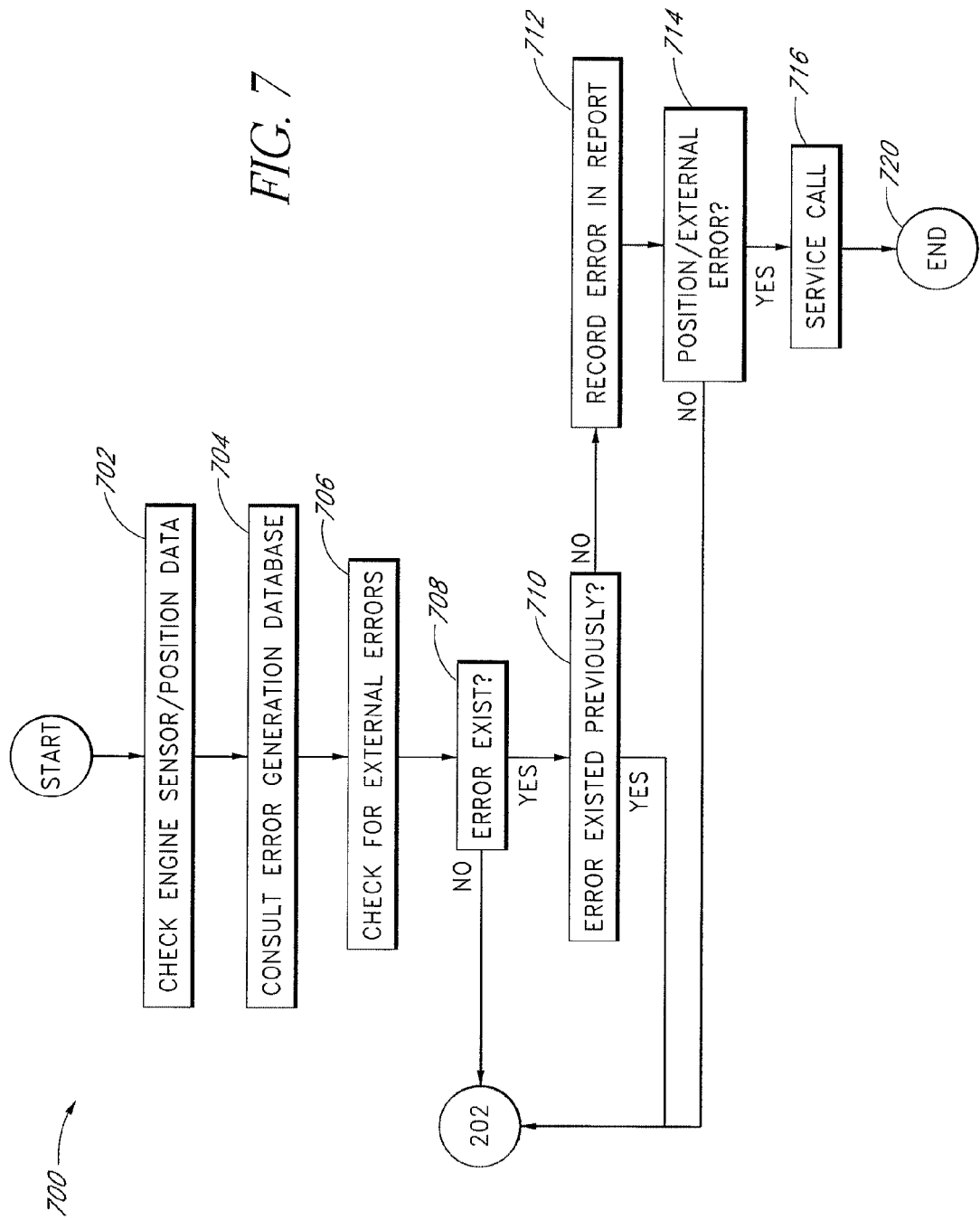
FIG. 7 illustrates an embodiment of a status validation method of the system of FIG. 1.

The alarm system 108 may further employ an integrity verification and alarm method 700, illustrated in FIG. 7. In one embodiment, the method 700 may be continuously and cyclically performed in advance of the vehicle status determination method 200 of FIG. 2 to ensure that the vehicle status determined by the method 200 is free from tampering. In alternative embodiments, the method 700 may be performed at selected intervals or may be user initiated, as necessary. As discussed below, under certain circumstances, error reports may be generated to inform supervisors of malfunctioning equipment.

The method 700 begins in Block 702 where the method 700 determines what vehicle data (engine parameters, position and/or velocity data) are being provided by the sensor 106 as a function of time.

The method then moves to Block 704, where information about what vehicle data is provided by the sensor 106 is used to determine whether there is an error in the measurements of the sensor 106. For example, the database 120 may comprise at least one association between vehicle data measured by the sensor 106 and error conditions. Thus, in an embodiment, the vehicle data may be received by the data processing device 116, which in turn inputs the received vehicle data to the database 120. In response, the database determines whether an error condition exists and provides this information to the data processing device 116 (Block 706). Table 3, below, illustrates an embodiment of such associations. While Table 3 presents possible error conditions in light of position data received, it may be understood that similar results are obtained if the sensor directly measures velocity as well.

TABLE 3

Associations between position and/or velocity, engine parameters, and error conditions

| | | Engine | |
|---|---|---|---|
| | | Read | No Read |
| Position | Inoperative | Error - Position | Error - Position |
| | Operative with move | No error | Error - Engine |
| | Operative without move | No error | No error |

Table 3 presents a table which determines whether an error condition is noted by the method 700 for three different cases of position data status and two different cases of engine sensor status. The "inoperative" status with respect to position indicates that no position data is received. The "operative with move" status with respect to position indicates that position data is received and vehicle movement is recorded. The "operative with move" status with respect to position indicates that position data is received and no vehicle movement is recorded. The "read" status with respect to the engine indicates that engine data is received, while "no read" status with respect to the engine indicates that engine data is not received.

In one embodiment, if no position and/or velocity are recorded by the sensor 106, then an error condition is determined, regardless of the status of the engine data. This determination reflects that the lack of position data is a fatal error, as discussed in greater detail below.

In another embodiment, if the position data indicates that the vehicle is moving, the status of the engine data determines whether an error is determined. In one example, when engine data is received, no error is determined. This determination reflects that, when the vehicle is moving and both position and engine data are received, the sensor 106 does not provide any indication that it is malfunctioning. In another example, when no engine data is received, an error is determined. This determination reflects that, when the vehicle is moving and position, but not engine data, are received, the sensor 106 is malfunctioning.

In a further embodiment, if the position data indicates that the vehicle is not moving, then irrespective of the status of the engine data, no error is determined. This determination reflects that, when the vehicle is not moving, the absence of engine data is not an indication of sensor 106 malfunction.

In additional embodiments, where only position and/or velocity data are measured by the sensor 106, the system 100 may employ the determinations of Table 3 illustrated for the Engine—Read column.

The method then moves to Block 706, where errors external to the sensor 106 are determined. In one embodiment, errors which are external to the sensor may be recorded by the system 100 during operation. These errors may then be accessed during the method 700. Non-limiting examples of events which may trigger recordation of an external error may include unauthorized opening of the hardened case, the shut-off of power to at least a portion of the system 100, failure of internal component CRC verification, disconnecting an antenna which allows transmission/reception of data by the system 100, and detection of vibration by an inertial sensor component of the sensor 106. The events may further comprise unauthorized opening of access doors, cargo doors, engine compartment doors, and removal of the fuel cap. In one embodiment, an external error may be recorded in the memory 130 of the system 100. In alternative embodiments, external errors may be recorded in the database 120. In Block 706, the method 700 determines whether an external error has been recorded.

Moving to Block 708, the method 700 subsequently determines whether an error has been recorded by the system 100. These errors may comprise any combination of errors detected in Block 704, for sensor malfunctions and Block 706 for external errors. If no errors are detected, the method 700 moves to step 202 of the method 200 of vehicle status determination. If errors are detected, then the method 700 moves to Block 710.

In Block 710, the method 700 determines whether the recorded errors had been previously identified. If the errors have been previously identified, the method 700 moves to step 202 of the method 200 of vehicle status determination. If the errors have not been previously identified, the method 700 moves to Block 712, where the method 700 records the errors which have been determined in a report. The decision to proceed with the vehicle status measurement if an error has been previously recorded reflects that it is undesirable to issue redundant non-fatal errors which have already been identified.

In one embodiment, the report may be transmitted to selected users 126 by the data delivery system 104. In alternative embodiments, the report may be stored by the system 100 and provided to users 126 on request. In another embodiment, for clients 126 who may employ a 24/7 "on watch" vigilance system, reports may be relayed to those 126 users who are not connected to the system via e-mail, cell phone SMS or cell phone e-mail.

After recording the errors in an error report, in Block 712, the method 700 moves to Block 714. In Blocks 714-720, the method 700 determines whether the errors are fatal or not and proceeds accordingly. Errors in position and/or velocity measurement, or external errors, are considered fatal errors which cause the method 700 to request a service call (Block 720). This determination is made because these data are necessary for vehicle status determination. If the data are not received, or tampered with, then the vehicle status determination cannot be made or is suspect. Thus, after issuing the service call, the method 700 ends.

In contrast, because errors in engine parameter data do not preclude vehicle status determinations, errors in engine parameter data are not considered fatal. Thus, upon determining that the errors are only with respect to the engine data, the method 700 then moves to step 202 of the method 200 of vehicle status determination.

Thus, use of the system 100 makes it possible to monitor larger numbers of personnel, and thus larger amounts of work, than are possible today. Thus, appropriate incentives and sanctions may be provided to vehicle operators in order to reward or change behaviors, helping to maintain and enhance productivity. The system 100 also allows flowing directly from the centralization of data, the centralization of authority as the information is brought from remote areas to computers connected to networks, such as the Internet in near real time. This enables public works, and private providers, to manage what was before out of sight, and thereby create transparent enterprises, accountable in far more specific terms than is possible today.

Although the foregoing description has shown, described, and pointed out the fundamental novel features of the present teachings, it will be understood that various omissions, substitutions, and changes in the form of the detail of the apparatus as illustrated, as well as the uses thereof, may be made by those skilled in the art, without departing from the scope of the present teachings. Consequently, the scope of the present teachings should not be limited to the foregoing discussion, but should be defined by the appended claims.

What is claimed is:

1. A method of representing an efficiency of a vehicle, comprising:
    electronically receiving, at a computing device, a plurality of vehicle positions as a function of time;
    determining, by the computing device, at least one vehicle status as a function of time, wherein the status is based at least in part upon the vehicle position as a function of time;
    determining, by the computing device, at least one geographical area associated with a selected vehicle status over a selected time interval;
    calculating, by the computing device, an efficiency of the vehicle using at least a total time the vehicle is determined to be in the selected vehicle status over the selected time interval; and
    providing, by the computing device, a map upon which is superimposed a geometric figure representative of the geographic area, wherein the geometric figure is further provided with a visual indicator of the efficiency of the vehicle
    wherein determining the geographic area comprises;
        identifying a maximum latitude, a maximum longitude, a minimum latitude, and a minimum longitude of the plurality of vehicle positions when the vehicle is in the selected status over the selected time interval;
        identifying two spatial points comprising the maximum latitude, maximum longitude and the minimum latitude, minimum longitude; and
        constructing a rectangle having the two spatial points as opposite corners.

2. The method of claim 1, wherein determining the vehicle status comprises:
    calculating a velocity from the received position as a function of time;
    accessing a database containing at least one association between a velocity range and the vehicle status; and
    assigning the vehicle status as the vehicle status within the database which is associated with the velocity range containing the calculated velocity.

3. The method of claim 1, wherein the efficiency is taken as the ratio of the total time the vehicle is determined to be in the selected vehicle status over the selected time interval to a reference standard.

4. The method of claim 1, wherein the visual indicator comprises at least one of a color or pattern which is associated with a range of efficiencies.

5. The method of claim 1, wherein the geographic area comprises a line.

6. A system for geographically representing an efficiency of a vehicle, comprising:
    a sensor configured to electronically measure a plurality of positions of the vehicle as a function of time;
    an analysis component which is configured to determine a work area over which the vehicle has worked within a selected time and an efficiency of the work based upon the vehicle's position as a function of time; and
    an interface device configured to provide reports containing at least a map upon which is superimposed a geometric figure representative of a geographic area, wherein the geometric figure is further provided with a visual indicator of the efficiency of the vehicle
    wherein the work area is determined by;
        identifying a maximum latitude, a maximum longitude, a minimum latitude, and a minimum longitude of the plurality of vehicle positions when the vehicle is working over the selected time.
        identifying two spatial points comprising the maximum latitude, maximum longitude and the minimum latitude, minimum longitude; and
        constructing a rectangle having the two spatial points as opposite corners.

7. The system of claim 6, wherein the vehicle is determined to be working when a vehicle velocity lies within a selected velocity range.

8. The system of claim 6, wherein the work area comprises a line.

9. The system of claim 6, wherein the visual indicator comprises at least one of a color or pattern which is associated with a range of efficiencies.

10. The system of claim 6, wherein the vehicle efficiency is taken as a ratio of the total time the vehicle is working over a selected time interval to the selected time interval.

* * * * *